US012444196B2

(12) United States Patent
Eadelman et al.

(10) Patent No.: US 12,444,196 B2
(45) Date of Patent: Oct. 14, 2025

(54) PREDICTIVE SYSTEM FOR ELOPEMENT DETECTION

(71) Applicant: AvaSure, LLC, Belmont, MI (US)

(72) Inventors: Walter Eadelman, Belmont, MI (US); Adam Jamison Whitmore, Caledonia, MI (US); James Zampa, Grand Rapids, MI (US); Daniel William Michaels, Belmont, MI (US); Scott Priolo, Belmont, MI (US)

(73) Assignee: AVASURE, LLC, Belmont, MI (US)

( * ) Notice: Subject to any disclaimer, the term of this patent is extended or adjusted under 35 U.S.C. 154(b) by 340 days.

(21) Appl. No.: 17/978,527

(22) Filed: Nov. 1, 2022

(65) Prior Publication Data

US 2023/0141862 A1 May 11, 2023

Related U.S. Application Data

(60) Provisional application No. 63/277,241, filed on Nov. 9, 2021.

(51) Int. Cl.
*G06V 20/52* (2022.01)
*G06V 20/40* (2022.01)
(Continued)

(52) U.S. Cl.
CPC .............. *G06V 20/52* (2022.01); *G06V 20/44* (2022.01); *G06V 40/168* (2022.01);
(Continued)

(58) Field of Classification Search
None
See application file for complete search history.

(56) References Cited

U.S. PATENT DOCUMENTS 7,477,285 B1 1/2009 Johnson
7,761,310 B2 7/2010 Rodgers
(Continued)

FOREIGN PATENT DOCUMENTS

CN 111083451 A 4/2020
EP 3618427 A1 3/2020
(Continued)

OTHER PUBLICATIONS

Bedeli, Marianna et al., "Clothing identification via deep learning: forensic applications," Forensic Sciences Research, Oct. 17, 2018, pp. 219-229, vol. 3, No. 3, Taylor & Francis Group, https://doi.org/10.1080/20961790.2018.1526251.

*Primary Examiner* — Delomia L Gilliard
(74) *Attorney, Agent, or Firm* — Price Heneveld LLP

(57) ABSTRACT

A patient monitoring system includes a camera that selectively delivers a video feed to a monitoring station. A processor evaluates the video feed, and converts the video feed into a plurality of data points for an elopement detection system. The plurality of data points correspond at least to a combination of facial features and components of clothing for each person within the video feed. The processor is further configured to associate the combination of facial features and the components of clothing for each person to define a confirmed association, to identify whether the person is a patient or a non-patient, to verify the confirmed association of the patient by comparing updated data points from the video feed with the confirmed association, and to activate an alert when the confirmed association of the patient is unverified based upon a comparison with the updated data points.

20 Claims, 17 Drawing Sheets

(51) Int. Cl.
*G06V 40/16* (2022.01)
*H04N 7/18* (2006.01)
*H04N 23/695* (2023.01)

(52) U.S. Cl.
CPC ........... *G06V 40/172* (2022.01); *H04N 7/183* (2013.01); *H04N 23/695* (2023.01)

(56) References Cited

U.S. PATENT DOCUMENTS

| | | | |
|---|---|---|---|
| 7,786,874 B2 | 8/2010 | Rodgers | |
| 7,911,348 B2 | 3/2011 | Rodgers | |
| 7,987,069 B2 | 7/2011 | Rodgers et al. | |
| 8,452,372 B2 | 5/2013 | Peyman | |
| 8,471,899 B2 | 6/2013 | Johnson | |
| 8,675,059 B2 | 3/2014 | Johnson et al. | |
| 8,676,603 B2 | 3/2014 | Johnson | |
| 8,903,468 B2 | 12/2014 | Peyman | |
| 9,037,217 B1 | 5/2015 | Peyman | |
| 9,041,810 B2 | 5/2015 | Ecker et al. | |
| 9,311,540 B2 | 4/2016 | Ecker et al. | |
| 9,318,012 B2 | 4/2016 | Johnson et al. | |
| 9,392,945 B2 | 7/2016 | Al-Ali et al. | |
| 9,510,974 B1 | 12/2016 | Peyman | |
| 9,536,052 B2 | 1/2017 | Amarasingham et al. | |
| 9,785,744 B2 | 10/2017 | Johnson et al. | |
| 9,794,523 B2 | 10/2017 | Greco et al. | |
| 9,866,797 B2 | 1/2018 | Clark et al. | |
| 9,931,171 B1 | 4/2018 | Peyman | |
| 9,934,427 B2 | 4/2018 | Derenne et al. | |
| 9,959,471 B2 | 5/2018 | Johnson et al. | |
| 10,044,989 B2 | 8/2018 | Greco et al. | |
| 10,055,961 B1 | 8/2018 | Johnson et al. | |
| 10,080,090 B2 | 9/2018 | Park et al. | |
| 10,217,004 B2 | 2/2019 | Johnson et al. | |
| 10,276,019 B2 | 4/2019 | Johnson et al. | |
| 10,278,648 B2 | 5/2019 | Al-Ali et al. | |
| 10,349,898 B2 | 7/2019 | Al-Ali et al. | |
| 10,372,873 B2 | 8/2019 | Johnson | |
| 10,382,727 B2 | 8/2019 | Clark et al. | |
| 10,387,720 B2 | 8/2019 | Johnson et al. | |
| 10,456,209 B2 | 10/2019 | Peyman | |
| 10,496,788 B2 | 12/2019 | Amarasingham et al. | |
| 10,524,702 B2 | 1/2020 | Marra et al. | |
| 10,540,876 B2 | 1/2020 | Johnson et al. | |
| 10,565,456 B2 | 2/2020 | Johnson et al. | |
| 10,593,426 B2 | 3/2020 | Amarasingham et al. | |
| 10,610,307 B2 | 4/2020 | Kotian et al. | |
| 10,630,941 B2 | 4/2020 | Greco et al. | |
| 10,729,384 B2 | 8/2020 | Al-Ali et al. | |
| 10,755,369 B2 | 8/2020 | Amarasingham et al. | |
| 10,833,912 B2 | 11/2020 | Safar et al. | |
| 10,964,186 B2 | 3/2021 | Verma | |
| 11,328,571 B2 | 5/2022 | Hanson et al. | |
| 2011/0274314 A1 | 11/2011 | Yang et al. | |
| 2012/0154582 A1 | 6/2012 | Johnson et al. | |
| 2014/0207486 A1 | 7/2014 | Carty et al. | |
| 2015/0025329 A1 | 1/2015 | Amarasingham et al. | |
| 2015/0049887 A1* | 2/2015 | Bleacher | G06V 20/59 381/302 |
| 2015/0109442 A1* | 4/2015 | Derenne | H04N 7/185 348/143 |
| 2017/0147773 A1 | 5/2017 | Van De Stolpe et al. | |
| 2017/0193772 A1* | 7/2017 | Kusens | G08B 25/009 |
| 2017/0231531 A1 | 8/2017 | Heinrich et al. | |
| 2017/0323074 A1 | 11/2017 | Chiang | |
| 2018/0049677 A1 | 2/2018 | Marra et al. | |
| 2018/0227547 A1 | 8/2018 | Derenne et al. | |
| 2018/0261307 A1 | 9/2018 | Couse et al. | |
| 2019/0013101 A1 | 1/2019 | Johnson et al. | |
| 2019/0108909 A1 | 4/2019 | Lee et al. | |
| 2019/0207486 A1 | 7/2019 | De Filippis | |
| 2019/0298270 A1 | 10/2019 | Al-Ali et al. | |
| 2019/0392941 A1 | 12/2019 | Johnson | |
| 2020/0066405 A1 | 2/2020 | Peyman | |
| 2020/0111340 A1 | 4/2020 | Johnson et al. | |
| 2020/0151462 A1 | 5/2020 | Johnson et al. | |
| 2020/0228755 A1 | 7/2020 | Greco et al. | |
| 2020/0323494 A1 | 10/2020 | Al-Ali et al. | |
| 2020/0382451 A1 | 12/2020 | Ogawa et al. | |
| 2020/0395105 A1* | 12/2020 | Koby | G06V 20/20 |
| 2021/0049887 A1* | 2/2021 | Hanson | A61B 5/1117 |
| 2021/0202052 A1* | 7/2021 | Bechtel | G16H 50/30 |
| 2023/0141862 A1* | 5/2023 | Eadelman | G06V 40/23 382/103 |

FOREIGN PATENT DOCUMENTS

| | | |
|---|---|---|
| EP | 3706035 A1 | 9/2020 |
| WO | 2007081629 A2 | 7/2007 |
| WO | 2009064788 A1 | 5/2009 |
| WO | 2013033655 A1 | 3/2013 |
| WO | 2013057652 A2 | 4/2013 |
| WO | 2015009513 A2 | 1/2015 |
| WO | 2016058866 A1 | 4/2016 |
| WO | 2017192784 A1 | 11/2017 |
| WO | 2019014521 A1 | 1/2019 |
| WO | 2020033644 A1 | 2/2020 |
| WO | 202126329 A1 | 2/2021 |

* cited by examiner

PREDICTIVE SYSTEM FOR ELOPEMENT DETECTION

CROSS-REFERENCE TO RELATED APPLICATION

This application claims priority to and the benefit under 35 U.S.C. § 119(e) of U.S. Provisional Patent Application No. 63/277,241 filed on Nov. 9, 2021, entitled PREDICTIVE SYSTEM FOR FALL PREVENTION, the entire disclosure of which is hereby incorporated herein by reference.

FIELD OF THE INVENTION

The present invention generally relates to surveillance and monitoring systems, and more specifically, a patient monitoring system that can be used for predicting adverse events within a patient care setting.

BACKGROUND OF THE INVENTION

Within many hospital settings, video surveillance is used to monitor the position and status of a patient within the patient's bed. This is frequently used in conjunction with an offsite human observer that monitors the video feed. This type of patient monitoring typically includes the offsite observer either communicating with the patient or communicating with hospital staff about when an adverse event has occurred or is about to occur. This type of monitoring requires continuous surveillance by the offsite observer over several hours during the course of a particular observation shift.

SUMMARY OF THE INVENTION

According to an aspect of the present disclosure, a patient monitoring system includes a camera that selectively delivers a video feed to a monitoring station. A processor evaluates the video feed, and converts the video feed into a plurality of data points for an elopement detection system. The plurality of data points for the elopement detection system correspond at least to a combination of facial features and components of clothing for each person within the video feed. The processor is further configured to associate the combination of facial features and the components of clothing for each person to define a confirmed association, to identify, for each confirmed association, whether the person is a patient or a non-patient, to verify the confirmed association of the patient by comparing updated data points from the video feed with the confirmed association, and to activate an alert when the confirmed association of the patient is unverified based upon a comparison with the updated data points.

According to another aspect of the present disclosure, a method for operating an elopement detection system for a patient monitoring system includes the steps of activating the elopement detection system when a patient is outside of a predetermined boundary, analyzing buffered sections of a video feed to identify a combination of facial features and components of clothing for the patient outside of the predetermined boundary, associating the combination of facial features with the components of clothing for each person to define a confirmed association, verifying the confirmed association of the patient by comparing the combination of facial features with the components of clothing of the patient, and activating an alert if the confirmed association of the patient is unverified based upon changes in the combination of facial features or the components of clothing of the confirmed association.

According to yet another aspect of the present disclosure, a method for detecting an elopement condition includes the steps of receiving user input to enable image processing, where the user input is related to a monitored patient exiting a predetermined boundary, generating a new video stream handling a request related to the user input, presenting the new video stream to an observer client for heightened monitoring of the monitored patient, processing the new video stream using a real-time streaming protocol to compare the new video stream to historical data related to past elopement events, adjusting a monitoring device to track the monitored patient within a patient care setting, and activating an elopement alert when an elopement indicator is determined. The elopement indicator includes confirmation that the monitored patient is outside of a video feed and is determined to be outside of the patient care setting.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 1:
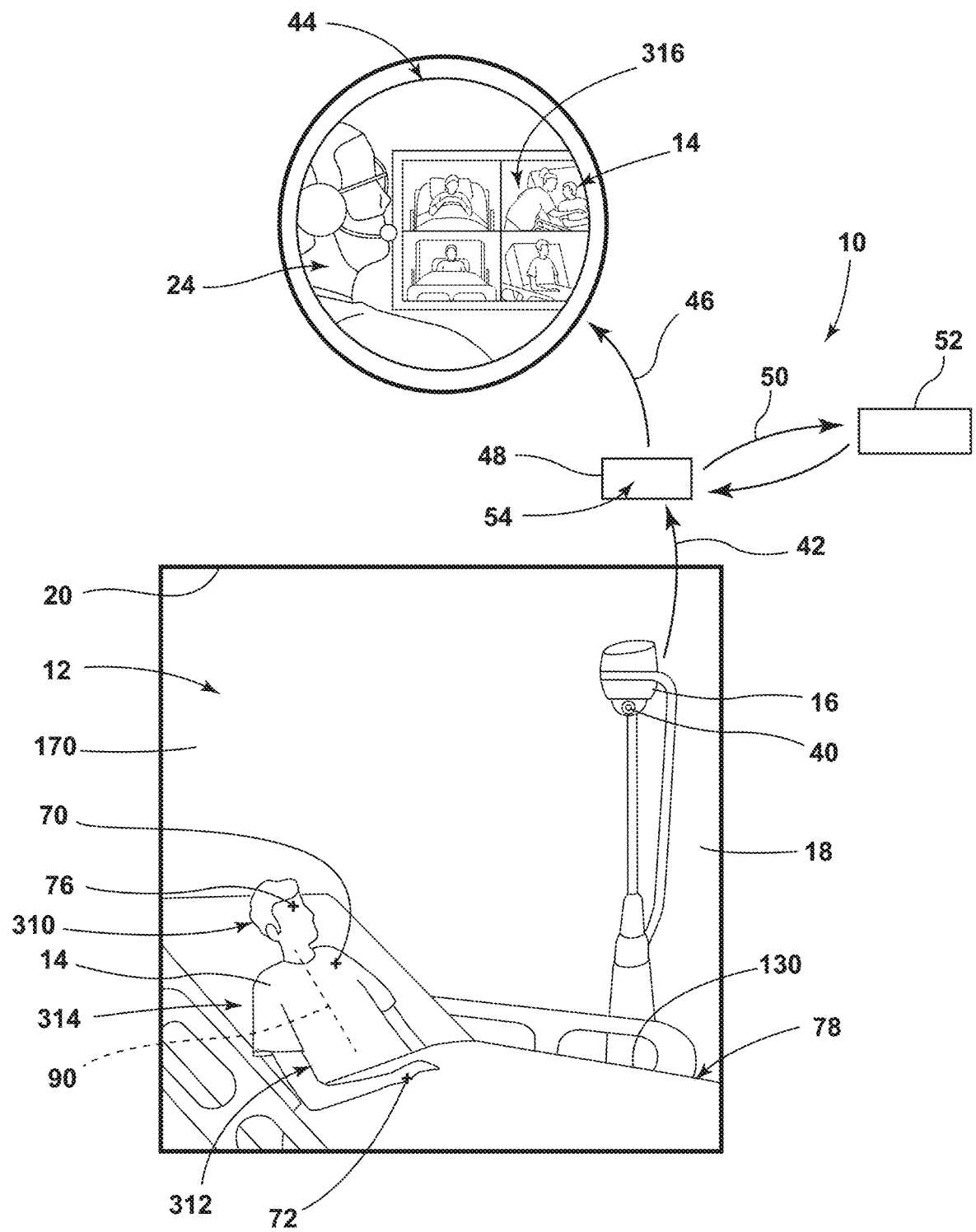
FIG. 1 is a schematic diagram illustrating a patient care setting with a mobile monitoring unit positioned to allow for observation of a patient.
Figure 2:
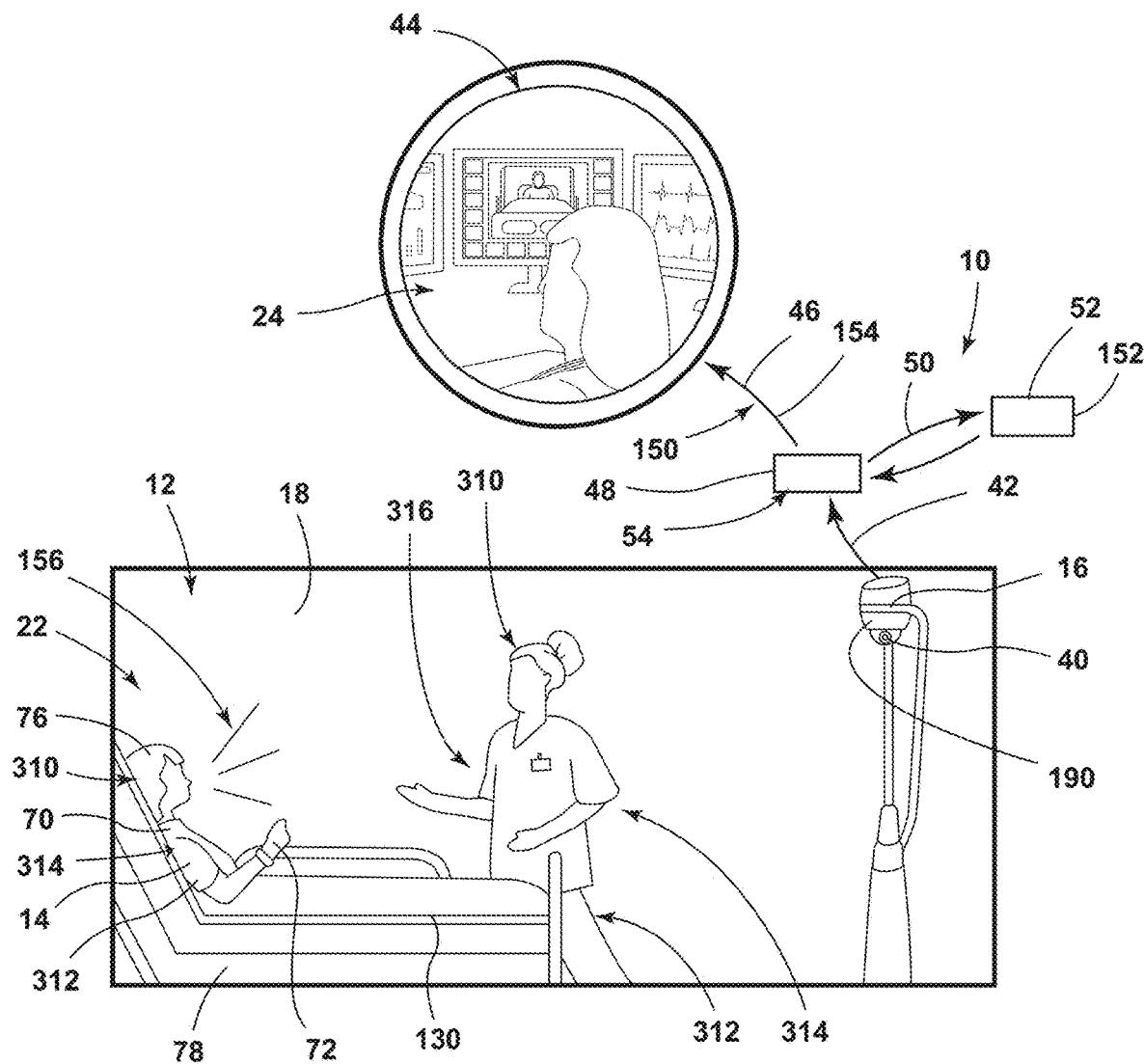
FIG. 2 is a schematic diagram illustrating the patient monitoring system for use in observing events that take place within the patient care setting.
Figure 3:
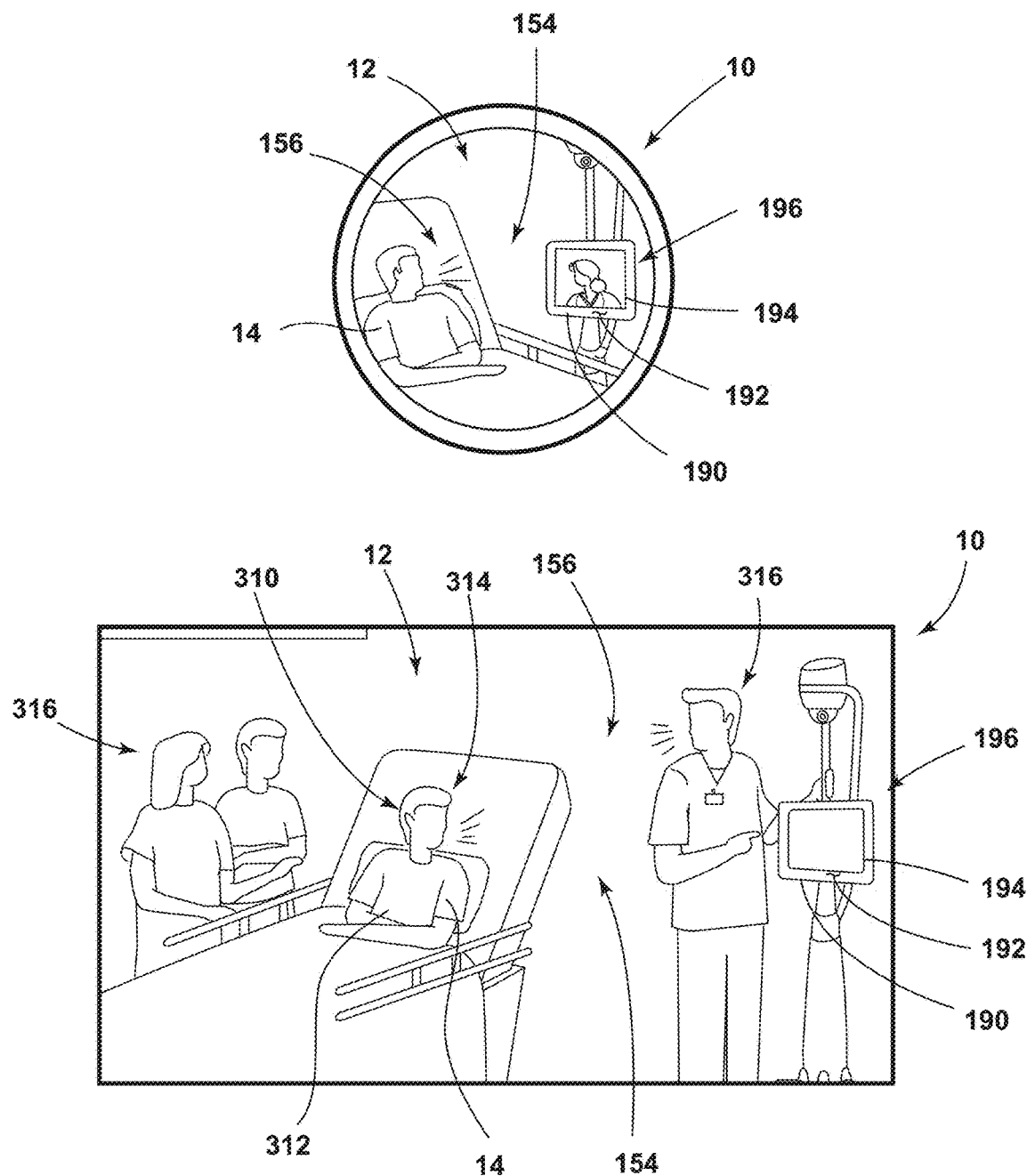
FIG. 3 is a schematic diagram illustrating use of the mobile monitoring unit via a display screen to allow for teleconferencing and other forms of telecommunication.

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a patient monitoring system that converts buffered video to a plurality of data points and utilizes these data points to assess the current position of a patient in a care space as well as the likelihood of potential future adverse events involving the patient. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-16, reference numeral 10 generally refers to a patient monitoring system that is positioned within a care setting 12 for monitoring the position, location, and status of a patient 14 within the care setting 12. The patient monitoring system 10 is usually placed within a patient's room or other similar care setting 12 for conducting audio and video surveillance of a patient 14. This type of surveillance is typically conducted within a care setting 12 where the patient 14 is a fall risk if the patient 14 gets out of bed 78. This surveillance can also be conducted where the patient 14 is a risk for removing or improperly adjusting medical equipment, at risk for elopement, as well as to monitor interactions between the patient 14 and other individuals within a care setting 12, and for other patient-care purposes. The patient monitoring system 10 can include a monitoring unit 16 that can be in the form of a stationary monitoring unit 16 that is attached to a wall 18 or ceiling 20 of a care setting 12 of the patient 14. The monitoring unit 16 can also be a mobile monitoring unit 16 that can be moved from one care setting 12 to another, as needed for monitoring patients 14 that may be at a higher risk for adverse events 22. As part of the stationary and mobile monitoring units 16, the video components, such as camera 40, typically include pan, tilt, and zoom (PTZ) tracking operability to more completely monitor the patient care setting 12.

Referring again to FIGS. 1-16, the patient monitoring system 10 is utilized for monitoring the occurrence of adverse events 22 and also for predicting adverse events 22. The patient monitoring system 10 includes the camera 40 that selectively delivers a video feed 42 to a monitoring station 44, where the video feed 42 is delivered as buffered sections 46 of video. The patient monitoring system 10 also includes a processor 48 that evaluates the buffered sections 46 of video. The processor 48 converts each buffered section 46 of video into a plurality of data points 50. The plurality of data points 50 typically correspond at least to positions of various features contained within the buffered section 46 of video. The processor 48 is further configured to store the plurality of data points 50 within a memory 52, analyze the plurality of data points 50 within a plurality of estimation networks 54 and deliver the video feed 42 to the monitoring station 44 at least when the plurality of estimation networks 54 determine that an adverse event 22 is likely.

The use of buffered sections 46 of video for delivering a particular video feed 42 is utilized to minimize interruptions in the observed video feed 42. These buffered sections 46 of video can be represented by a particular number of frames of the video feed 42 that are sent as a batch to a particular monitoring station 44. These buffered sections 46 of video are delivered sequentially and arranged at the monitoring station 44 so that they appear seamless to the offsite observer 24. When the buffered sections 46 of video are generated, these buffered sections 46 of video, before reaching the monitoring station 44, are evaluated by the processor 48. This processor 48, as described herein, converts each buffered section 46 of video into a plurality of data points 50. This conversion of the buffered section 46 of video into data points 50 can occur as a separate step after the video feed 42 is divided into the buffered sections 46 of video. Alternatively, the evaluation of the buffered sections 46 of video can occur as the video feed 42 is segmented into buffered sections 46 for delivery to the monitoring station 44. During this evaluation phase of the video feed 42, the buffered sections 46 of video are converted into the plurality of data points 50. In addition, as will be described more fully below, a single buffered section 46 of video can be analyzed using more than one estimation network 54 to generate multiple layers 180 of data points 50 that can be used cooperatively for determining the occurrence of or likelihood of an adverse event 22.

The various estimation networks 54 can also be used independently on one another, then compared for verification purposes. In addition, in the event that the system finds that an adverse event has occurred or is likely to occur, the estimation networks 54 or a separate estimation network 54 can be used to verify or confirm that the adverse event 22 actually occurred, was prevented, was imminent, did not occur or was determined to be a false positive alert. This verification system can be used to improve and train the various estimation networks 54 and improve the accuracy with respect to future events.

The data points 50 that are generated through the estimation networks 54 are typically in the form of universal data points 50 that are common to most patients 14 and patient care settings 12. As will be described in greater detail herein, the use of these plurality of data points 50 can be utilized when comparing a particular set of data points 50 to previously captured sets of data points 50. This is to prevent the data points 50 from being used to derive any identifying personal characteristics or other personal information regarding the patient 14. Also, the use of generic and universally applicable data points 50 allows for comparison of multiple sets of data points 50 for predictive comparison, as will be described more fully herein.

The captured set of data points 50 can correspond to various features and positions of features within the view of the video feed 42. By way of example, and not limitation, the plurality of data points 50 can correspond to a patient's shoulders 70, hands 72, feet 74, head 76, eyes, and other similar data points 50 that are shared by most individuals. The plurality of data points 50 can also include features contained within the care setting 12. Such features can include, but are not limited to, the boundaries of the bed 78 of the patient 14, the floor 80 of the care setting 12, the walls 18 of the care setting 12 and other similar stationary or generally non-moving features positioned within the care setting 12. In generating these data points 50, identifying characteristics found within the buffered sections 46 of video are eliminated such that no identifying characteristics of the patient 14 can be ascertained through the plurality of data points 50. Additionally, the locations of certain features are converted into the plurality of data points 50. These data points 50 are recorded and placed within a three-dimensional space and positioned relative to one another. Accordingly, while a particular section of the data points 50 may include a patient's head 76, information such as hair color, eye color, the shape of most facial features 310, and other identifying characteristics are not ascertainable from the data points 50. In certain aspects of the device, the resulting plurality of data points 50 can be represented as one or more wire frames that are positioned relative to one another. One such wire frame can be in the general form of a human figure, while other wire frames can provide information relating to the position of the bed 78 of the patient 14, and other features within the care setting 12.

In addition to converting the video feed 42 to the plurality of data points 50, certain data points 50 are extrapolated from the captured data points 50. By way of example and not limitation, the processor 48 can extrapolate the approximate location of the spine 90 of the patient 14 based upon the locations of the patient's shoulders 70 and head 76. As will be described more fully herein, one or more of the estimation networks 54 can utilize the position of the patient's spine 90 for determining the relative position of a patient 14 with respect to the bed 78, the floor 80, and/or other portions of the care setting 12.

As described herein, the buffered sections 46 of video are not recorded or saved at any stage of the process for the patient monitoring system 10. Rather, the plurality of data points 50 are stored within the memory 52 for further analysis and later storage. These plurality of data points 50 that relate to a particular section of buffered video are stored within an onsite memory, an off-site memory, a cloud-based memory and other similar memory configurations. The buffered sections 46 of video are selectively delivered to the monitoring station 44 for view by the offsite observer 24. To protect the privacy of the patient 14, these buffered sections 46 of video are not saved.

Because each buffered section 46 of video includes a plurality of video frames, each buffered section 46 of video includes a certain amount of motion with respect to the various data points 50. Accordingly, as the processor 48 converts the various buffered section 46 of video into the plurality of data points 50, certain data points 50 may be converted into a range of motion or a vector with respect to a particular feature contained within the buffered section 46 of video. By way of example, and not limitation, if a buffered section 46 of video includes an individual moving from a prone position flat on the patient's back to a position on the patient's side, the buffered section 46 of video may be converted to a set of data points 50 that includes a vector with respect to one shoulder 70 moving from a beginning position to an ending position through the course of the various frames of the buffered section 46 of video. This motion of the particular data point 50 through the buffered section 46 of video can be converted into a vector having a particular motion value, such as acceleration or velocity. These data points 50 and vectors, over the course of multiple buffered sections 46 of video can be used to further define these vectors of motion with respect to the data points 50.

After the buffered sections 46 of video are converted into the plurality of data points 50, the processor 48 analyzes these plurality of data points 50 within a plurality of estimation networks 54. These estimation networks 54 can include various methods of evaluating the locations of various data points 50 with respect to other features within the care setting 12 and also evaluating the motion of various data points 50 over time. The various estimation networks 54 which will be described more fully herein can include, but are not limited to, a pose estimation network 100, an object detection network 102, a relative depth network 104, a field segmentation network 106 and a movement segmentation network 108. These various estimation networks 54 can operate independently or in combination with one another to derive and evaluate the various sets of data points 50.

Utilizing the various estimation networks 54, as described in FIGS. 4-8, the processor 48 can analyze the data points 50 to determine a particular location of a patient 14, or a portion of the body of the patient 14 within a care setting 12. This analysis of the data points 50 can alert hospital staff to an adverse event 22, such as a fall, without recording or saving any video of the patient 14 or the care setting 12. The process of evaluating, converting and analyzing the buffered sections 46 of video and the plurality of data points 50 is accomplished as the buffered sections 46 of video are delivered to the monitoring station 44 where an offsite observer 24 can review the video feed 42. In this configuration, the estimation networks 54 can be used to alert hospital staff with respect to the current position of the patient 14 as well as the occurrence of any adverse events 22. As will be described more fully herein, these estimation networks 54, in combination with stored sets 120 of data points 50, can also be used as a predictive tool for analyzing when an adverse event 22 is likely to occur in the future.

According to various aspects of the device, as exemplified in FIGS. 4-10, the patient monitoring system 10 can also operate the processor 48 to compare the plurality of data points 50 that are converted from the buffered sections 46 of video against previously stored sets 120 of data points 50. These previously stored sets 120 of data points 50 can be from the same patient 14 or from any one of various patients 14 that may have been monitored using the patient monitoring system 10 previously. Accordingly, the data points 50 obtained from any previous use of the patient monitoring system 10, from any patient 14, and from anywhere in the world, are generic data points 50 that do not contain any identifying information. The information related to the data points 50 also cannot be used to extrapolate the identity of the patient 14. While certain information related to the locations of features are analyzed, this information is used to derive a data point 50 in relation to a portion of the body of the patient 14. By way of example, and not limitation, the pose estimation network 100 may include some facial recognition features that can be used to determine the location of the eyes, nose, and mouth of a patient 14. However, this information may only be used to determine the location and orientation of the head 76 of the patient 14. The output of the pose estimation network 100 using these facial features 310 is typically limited to the location and orientation of the head 76 of the patient 14.

The object detection network 102 can also be used to determine what types of clothing the patient 14 is wearing and also the types of medical devices that are attached to the patient 14. Using this data, the processor 48 can identify certain additional reference points that may be useful in deriving the data points 50. As a non-limiting example, the pose estimation network 100 may determine that the patient 14 is wearing a gown. In this instance, the video feed 42 will have very limited information, if any, regarding the body of the patient 14 between the shoulders 70 and feet 74 of the patient 14. With this recognition, the processor 48 may provide more emphasis or devote more resources toward one or more of the other estimation networks 54.

As discussed herein, no distinguishable or ascertainable characteristics with respect to any patient 14 are recorded with the buffered section 46 of video into the data points 50. Accordingly, the stored sets 120 of data points 50 are recorded as generic wire frame movements with respect to a generic human form. Accordingly, when the processor 48 converts the buffered section 46 of video into the plurality of data points 50, these data points 50 are compared against numerous sets of previously stored data points 50 to determine whether the data points 50 captured from the buffered section 46 of video correspond to a particular chain of events that has occurred previously and which led to the occurrence of an adverse event 22.

It is also contemplated that the processor 48 can compare the plurality of data points 50 from the buffered section 46 of video against the plurality of data points 50 converted from an immediately previous buffered section 46 of video. Accordingly, the processor 48 utilizes these two sets of data points 50 to determine a plurality of corresponding vectors that reflect a difference between sequential sets of data points 50. These corresponding vectors can be used to determine if a particular data point 50 has moved as well as a velocity and acceleration of that data point 50 over time. By way of example, and not limitation, certain movements may be indicative of a fall, such as a quick downward movement toward the floor 80. Also, a quick upward movement of a particular data point 50 may be indicative of the patient 14 getting out of bed 78 or a patient 14 moving toward the edge of the bed 78. As discussed herein, these various corresponding vectors and data points 50 can be compared with one another and also compared against previously stored sets 120 of data points 50 to determine the status of the individual as well as conducting a comparative analysis of previously stored events that led to an adverse event 22.

The processor 48 can also analyze the plurality of data points 50 and the plurality of corresponding vectors within the plurality of estimation networks 54. In conducting this analysis, the processor 48 can be configured to determine whether the plurality of data points 50 are indicative of the patient 14 moving toward the edge of the bed 78 or attempting to get out of the bed 78. In this instance, the processor 48 can determine that the patient 14 should be monitored and can provide instruction that the video feed 42 should be delivered to the monitoring station 44 for surveillance and potential intervention. Using this configuration, only those video feeds 42 that contain data points 50 that are indicative of the patient 14 getting out of their bed 78 are delivered to a monitoring station 44 for review. Accordingly, the time and effort of the offsite observer 24 in monitoring various video feeds 42 can be focused on those situations that require our attention, rather than video feeds 42 that show no imminent danger of an adverse event 22.

Referring now to FIGS. 4-8, which reference various implementations and embodiments of the estimation networks 54, it is contemplated that an initial step of the usage of the estimation networks 54 occurs in determining whether a patient 14 has left the bed 78 within their care facility. In a certain aspect of the device, exemplified in particular within a portion of FIG. 8, the patient monitoring system 10 utilizes the pose estimation network 100 and the object detection network 102 for determining the position of the patient 14 within their bed 78. The pose estimation network 100 can include an analysis of various data points 50 of the patient 14. These data points 50 can include the shoulders 70, and various portions of the head 76, such as the top of the head 76 and eyes. As discussed herein, the pose estimation network 100 can utilize these data points 50 for estimating the location of the spine 90 for the individual. Typically, the spine 90 will be located between the shoulders 70 and below the top of the head 76, and generally between the eyes. Other data points 50 relating to the patient's body can also be recorded, such as the patient's feet 74, hands 72, and other visible portions of the patient's body. Utilizing the pose estimation network 100, the orientation of the patient's body within the bed 78 can be ascertained.

In addition, the patient monitoring system 10 utilizes the object detection network 102 for defining a boundary line 130 that typically extends around the body of the patient 14 and a boundary box 132 that is positioned relative to a bed 78 of the patient 14. Utilizing the pose estimation network 100 and the object detection network 102, the processor 48 for the patient monitoring system 10 can derive the orientation and position of the body of the patient 14, using only the plurality of data points 50, with respect to the designated boundary line 130 surrounding the patient 14. When the boundary line 130 surrounding the patient 14 approaches or crosses the boundary box 132 of the bed 78, this can be an indication that the patient 14 is attempting an exit of the bed 78. This boundary box 132 can be in the form of the outer edges of the patient's bed 78, and the boundary line 130 can be a perimeter that surrounds the patient's body. Utilizing the pose estimation network 100 and the object detection network 102, the patient monitoring system 10 can ascertain events where the patient 14 appears to be attempting to get out of their bed 78. At this point, the processor 48 can notify the patient monitoring system 10 to activate additional processing capabilities and additional estimation networks 54 for monitoring the patient 14 in the care space.

Figure 4:
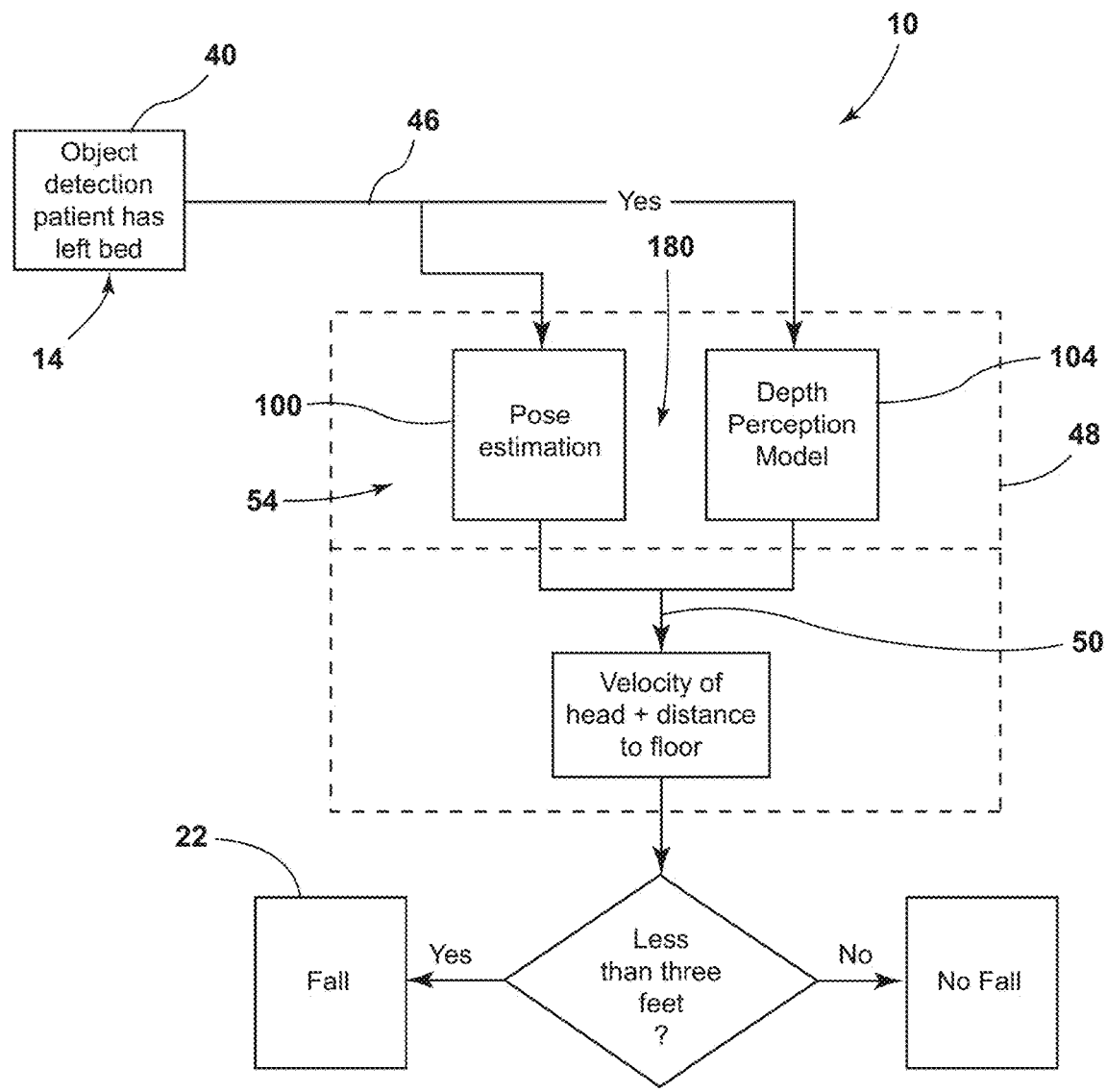
FIG. 4 is a schematic diagram illustrating a method for utilizing a pose estimation network and a relative depth network for monitoring a patient.
Figure 5:
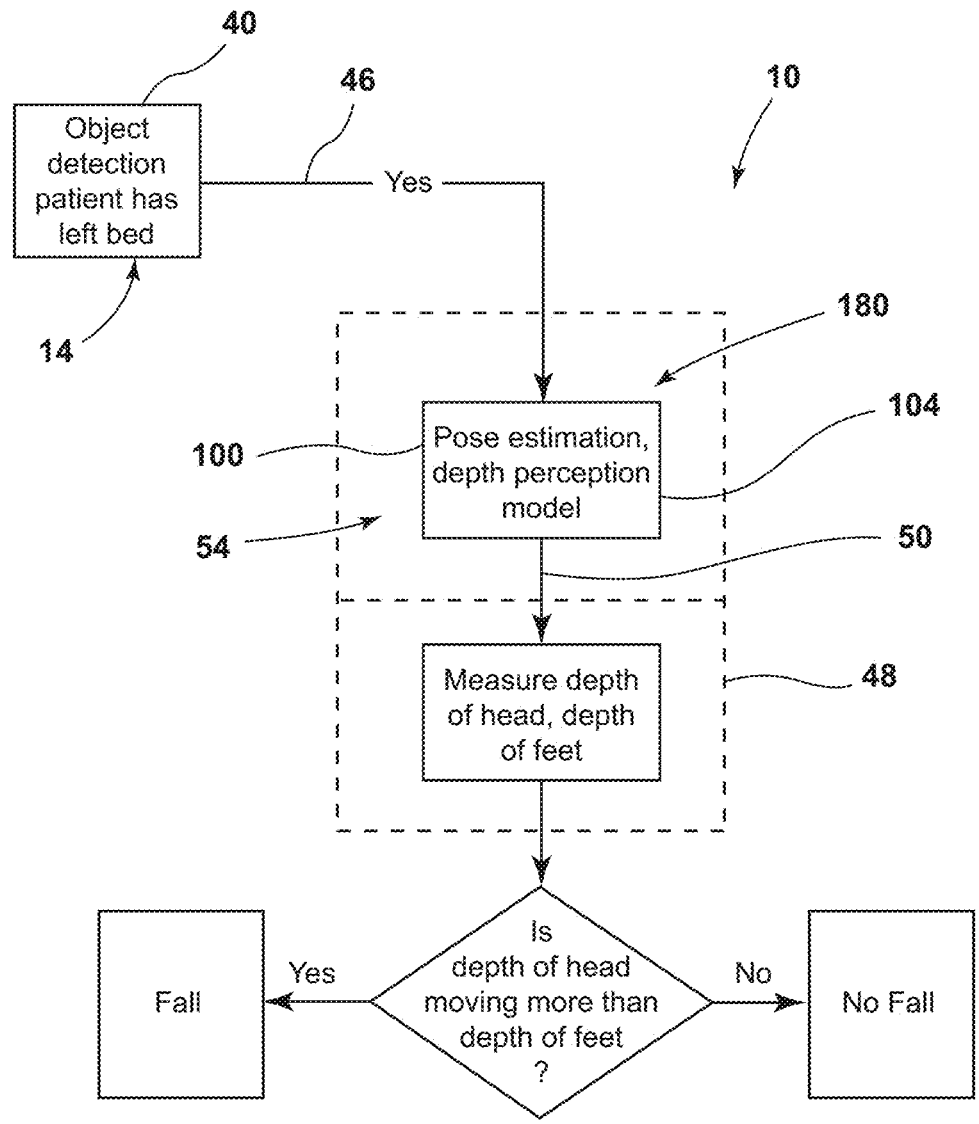
FIG. 5 is a schematic diagram illustrating a method for monitoring a patient utilizing another aspect of the pose estimation network and the relative depth network.

As exemplified in FIGS. 4 and 5, after the pose estimation network 100 and the object detection network 102 have determined that the patient 14 is attempting to get out of their bed 78 or has left their bed 78, the pose estimation network 100 can be used to monitor the position of the spine 90 with respect to the floor 80 or other horizontal plane or vertical plane. Accordingly, the angle of the patient's spine 90 can be determined through the analysis of the various data points 50. In addition, the patient monitoring system 10 can utilize a relative depth network 104 that monitors the position of the head 76 or other similar body part of the patient 14 in space.

Referring again to FIGS. 4 and 5, the relative depth network 104 can determine the position of the head 76 of the patient 14 in space through various analysis mechanisms. One such mechanism is through an analysis of the pixels of the buffered section 46 of video. A distance of the patient's head 76 from the camera 40 for the patient monitoring system 10 can be determined through an analysis of the individual pixels. This can be done through an analysis of the distance between various data points 50. In one non-limiting example, these data points 50 can be compared at a particular point in time in relation to the distance between the same data points 50 when the patient 14 was in bed 78 or other similar range of time. Alternatively, or additionally, the relative depth network 104 can utilize the relative distance between the head 76 of the patient 14 and the floor 80 through an assessment of the pixels of the various data points 50 or pixels of the buffered section 46 of video. Using the relative position of the spine 90 of the patient 14 through the pose estimation network 100, in combination with the relative position of the head 76 of the patient 14 in space from the relative depth network 104, it can be determined whether a patient 14 is moving toward the floor 80, has fallen or is in the process of falling. These networks can also be utilized for determining whether a patient 14 has stood up next to their bed 78, or is attempting to walk through the care space when advised not to do so.

As exemplified in FIGS. 4 and 5, the use of the pose estimation network 100 and the relative depth network 104, as described herein, can be used to ascertain a relative position of the head 76 with respect to the floor 80, as well as a velocity or acceleration of the head 76 of the patient 14 towards the floor 80. Where this velocity is an accelerating pattern towards the floor 80, this can be indicative of a where the patient 14 is falling. Conversely, where the velocity is a consistent velocity or a slower velocity, this may be indicative of the patient 14 bending down to accomplish some task, such as tying a shoe. Using these networks, the processor 48 can evaluate the orientation of the individual's head 76 and position, in space, of the patient's head 76. When the patient's head 76 falls below approximately three feet, or other threshold, this can be indicative of an adverse event 22, such as a fall.

In certain aspects of the device, the object detection network 102 can create a bounding line that is in the form of an outline of the patient's body or general outline of the data points 50 that relate to the patient's body. In addition, as described herein, this bounding line can be defined as a particular space between the patient's body and an outer edge of the bed 78 that can be utilized for determining whether the patient 14 is attempting to get up or otherwise exit their bed 78. Accordingly, the object detection network 102 can be utilized for ascertaining whether the patient's body is in a horizontal position a vertical position, or somewhere in between.

Figure 6:
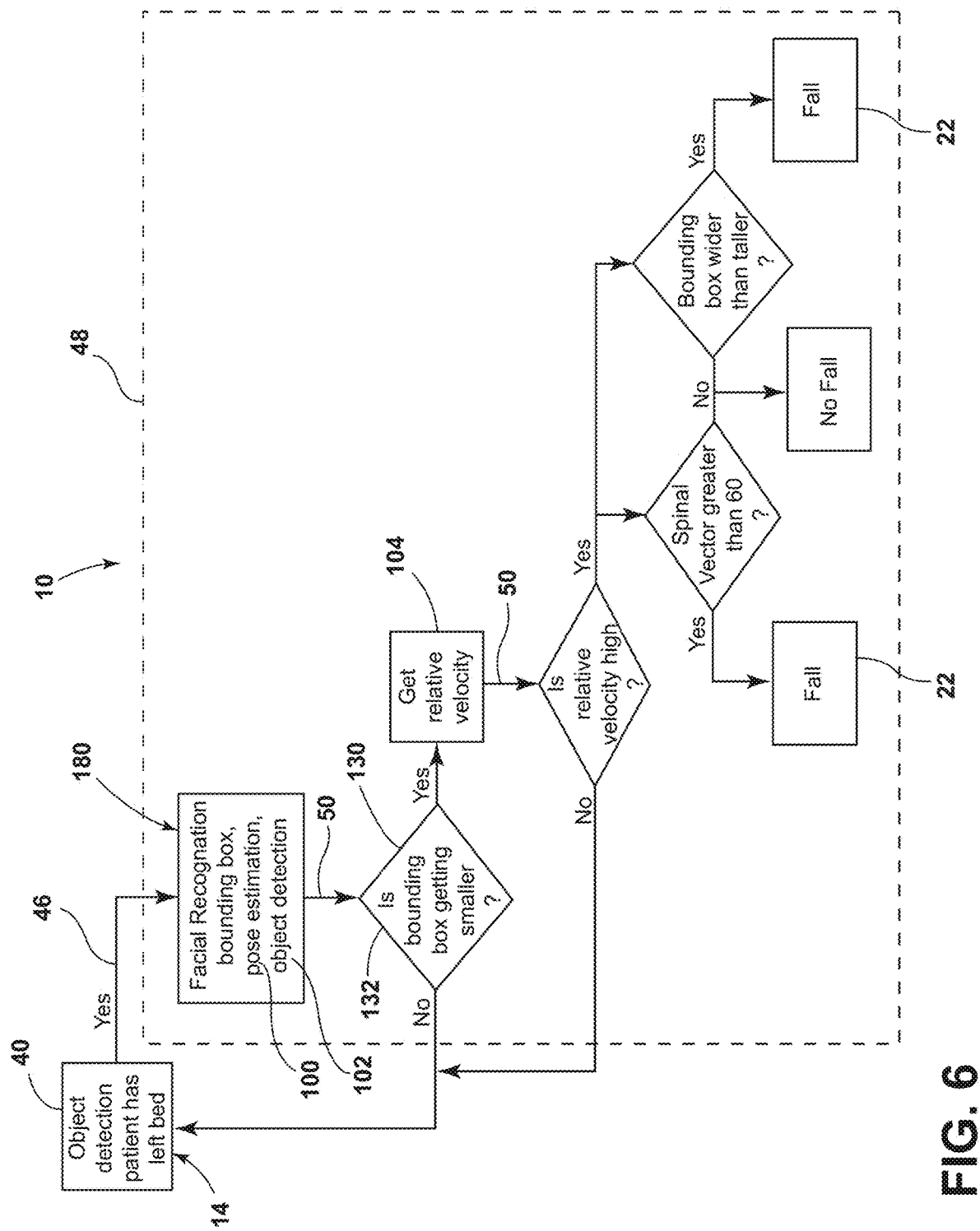
FIG. 6 is a schematic diagram illustrating a method for monitoring the position of a patient within a care setting utilizing a plurality of estimation networks in combination to determine whether an adverse event has occurred.

Referring now to FIG. 6, after the pose estimation network 100 and the object detection network 102 has determined that the patient 14 is attempting to leave the bed 78 or has left the bed 78, the pose estimation network 100 and the object detection network 102 can be utilized for determining the size and relative position of the bounding line that surrounds the patient 14. Accordingly, these networks can be used to determine whether the bounding line surrounding the patient 14 is getting smaller, or is getting more vertically oriented within the space. In addition, the processor 48 can utilize these data points 50 to determine whether the bounding line is transitioning from a more vertical position or a small size toward a more horizontal position or a larger size. Changes such as these can be indicative of the patient 14 falling. The size of this bounding line can be utilized for determining an approximate velocity that the patient 14 is moving toward the floor 80, in the form of a relative velocity. In addition, the pose estimation network 100 can contemporaneously monitor the position of the data points 50 relative to the spine 90 of the patient 14, as a confirmation with respect to the possible occurrence of an adverse event 22.

Accordingly, the various estimation networks 54 included within the patient monitoring system 10 are utilized to not only verify the position and location of the patient 14 within the care space, but also confirm or reconfirm the findings of any one or more of the other estimation networks 54 with respect to the occurrence of an adverse event 22 or the absence thereof. Utilizing these systems as a predictive tool, the various estimation networks 54 serve to gather the data points 50 and numerous evaluations of the data points 50 for building a historical catalog 140 or library of previously stored sets 120 of data points 50. This historical catalog 140 or library can be used as a comparative tool for analyzing data points 50 gathered from a particular buffered section 46 of video. This comparison can include comparing the various data points 50 with historical data, in the form of the previously stored sets 120 of data points 50, to determine whether current data matches trends or patterns within historical data for determining whether an adverse event 22 is likely to occur in the future.

By way of example and not limitation, historical data related to previously stored sets 120 of data points 50 can be categorized based upon the occurrence of confirmed adverse events 22, false positive adverse events 22 and false negative findings that no adverse event 22 has occurred. Using the plurality of data points 50 from the buffered sections 46 of video, an analysis of current data points 50 can be compared with the catalogs 140 of previously stored sets 120 of data points 50 for comparing against sequences, patterns, routines and other similarities that may be contained within the historical sets of data points 50.

Where a particular set of data points 50 captured from a buffered section 46 of video matches one or more previously stored sets 120 of data points 50, the video stream can be forwarded onto a monitoring station 44 so that an offsite observer 24 can begin surveillance of an individual that may, or is likely to, be moving toward an adverse event 22. In situations where the adverse event 22 is likely to occur or does occur, this data can be added to the historical catalog 140 for adjusting the parameters of each pattern, sequence or routine. Additionally, where the data points 50 from the buffered section 46 of video are contrary to the historical data, this can also be added to the historical catalog 140 to be used as a possible exception to a particular pattern or to refine the pattern to provide better predictive analysis in the future.

In certain aspects of the device, the various data points 50, including the derived vectors and other derived data can be recorded as a particular code or symbol. This code can be assigned to reflect at least a particular position, orientation, posture and demeanor of a patient 14. In such an aspect of the device, rather than recording the various data points 50, only the resulting code is recorded. This code can be derived from a single estimation network 54 or can be derived through a conglomeration of multiple estimation networks 54.

According to various aspects of the device, as exemplified in FIGS. 1-11, the buffered sections 46 of video can include a video stream as well as an audio stream 150. It is contemplated that each of the video stream and the audio stream 150 of the buffered section 46 of video can be separately converted into a plurality of visual data points 152 as well as a plurality of auditory data points 154 that make up the entire plurality of data points 50 for the particular buffered section 46 of video. Utilizing the auditory data points 154, the process can utilize verbal communication 156 that may take place within a particular care setting 12 for ascertaining the occurrence of an adverse event 22. In various aspects of the device, from an auditory device, a verbalization of distress or imminent danger, irritation or aggravation, and other similar emotions that can be expressed through auditory means. These auditory data points 154 can be gathered for purposes of determining an adverse event 22 that can include, but may not be limited to, verbal abuse by or toward the patient 14 or related someone else in the care space. The auditory data points 154 can be representations of information that can correspond to particular words, changes in volume of speech, changes in tenor of speech, screams, extreme coughing or trouble breathing, and other similar auditory signals. With respect to specific words or phrases, the auditory data points 154 can be in the form of symbols or code, as well as a textual or coded transcription of the observed word or phrase. As with the data points 50 that relate to more visual cues, these auditory data points 154 can be used for activating the delivery of the video feed 42 of the patient monitoring system 10 to the monitoring station 44 so that the patient 14 can be more closely observed by the offsite observer 24. The components of the buffered sections 46 of video that include the audio streams 150 can be analyzed through one or more estimation networks 54. These estimation networks 54 can operate to analyze both video and audio. In certain instances, one or more estimation networks 54 can be dedicated to the analysis of the audio streams 150. These estimation networks 54 can include a natural language processing network that can be used to evaluate vocabulary, syntax, parts of speech and other similar components of the audio stream 150. The estimation networks 54 can also include a voice activity detection network that can be used to monitor the frequency, amplitude, volume, tone and other components of the audio streams 150. As described, herein, the various estimation networks 54 can operate independently and can also be used to confirm or verify the observations of the other estimation networks 54.

In certain instances, the visual portion of the video feed 42 may not be available or may be required to be turned off. In such instances, such as personal care time for a patient 14, bathing, and other similar highly sensitive events. During these events, the video feed 42 may be switched off or at least "fuzzed out" in the area surrounding the patient 14. In these instances, the auditory data points 154 can be more closely analyzed and scrutinized for various events that may be occurring within the care space. In particular, it is during these moments of sensitive care that dialog between the patient 14 and a caregiver is likely to occur. This dialog can turn abusive in certain conditions and situations. The use of the auditory data points 154 can be useful in monitoring the interactions between the patient 14 and the caregiver in determining whether an event is likely to occur.

The visual data points 152 can be used to monitor the emotions and condition of the patient 14 and others in the care space. Facial recognition techniques can be used to derive a data point 50 or other code that can be indicative of a particular emotion or reaction. Using this information, the occurrence or absence of an adverse event 22 can be assessed, confirmed or verified in combination with one or more of the other estimation networks 54.

According to various aspects of the device, the data points 50 that are converted from the buffered sections 46 of video contain no personal information relating to the particular patient 14. Accordingly, use of the patient monitoring system 10 does not involve entry, recording or other capturing of any identifying patient data. All of the data utilized by the patient monitoring system 10 is through conversion of the buffered sections 46 of video into the data points 50. It is then these data points 50 that are utilized for monitoring the condition, position, and relative status of the patient 14 within the care space. While it is typical for the hospital to record and maintain records related to the patient identity and health-related information, this information is maintained in an entirely separate file or database apart from the patient monitoring system 10.

Figure 7:
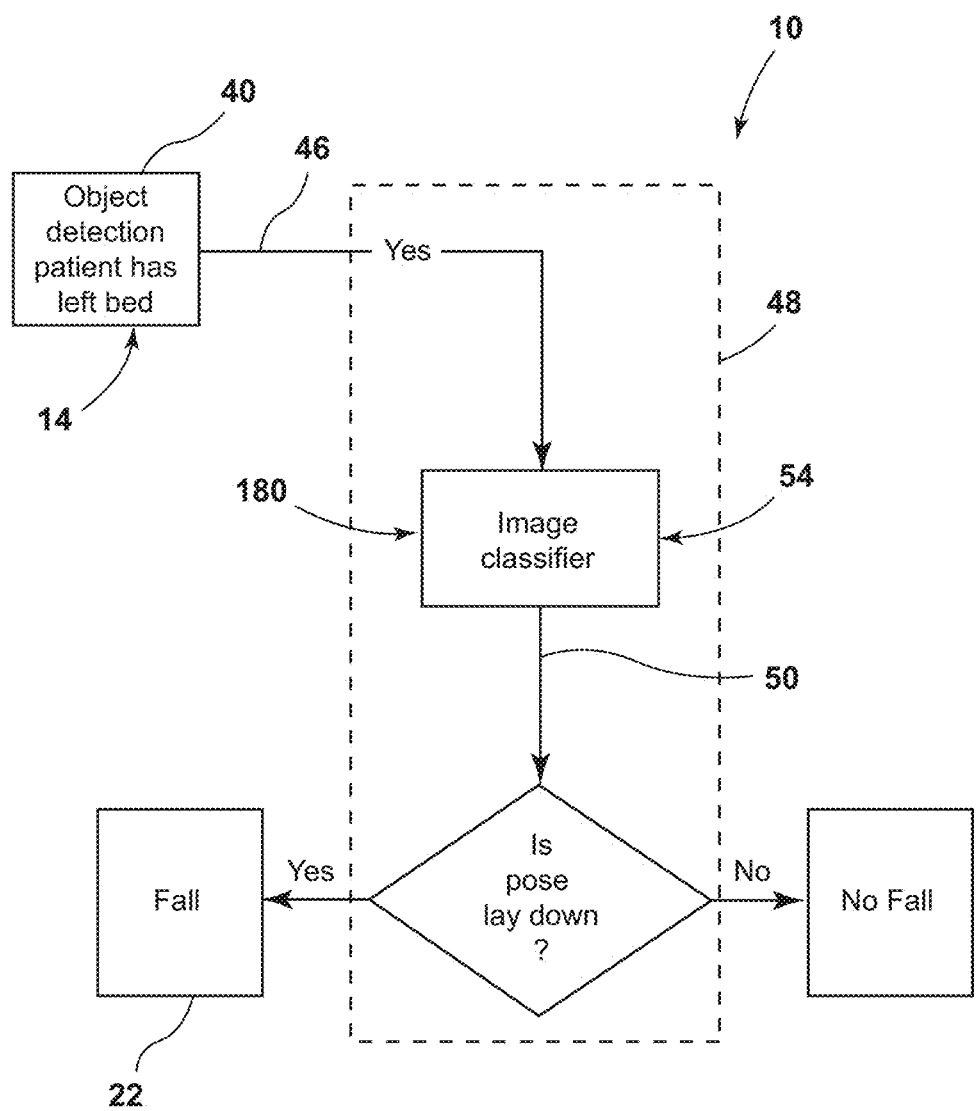
FIG. 7 is a schematic diagram illustrating a method for monitoring the position of a patient utilizing an image classifier for determining whether an adverse event has occurred.

Referring now to FIG. 7, after the patient monitoring system 10 recognizes that the patient 14 has left the bed 78 or is attempting to leave the bed 78, using the pose estimation network 100 and the object detection network 102, the processor 48 activates a secondary layer of recognition system for monitoring the status and position of the patient 14 within the care space. In certain aspects of the device, the patient monitoring system 10 can utilize a field segmentation network 106 and a movement segmentation network 108, that operate in combination to assess the position and status of the patient 14 within the care space. The field segmentation network 106 and the movement segmentation network 108 operate as an image classifier to separate those portions of the buffered sections 46 of video into stationary objects 170 of the care space (floor 80, the walls 18, the bed 78, and other static objects) from those objects that are moving within the care space (the patient 14, their clothing, medical devices coupled with the patient 14, and others).

By way of example, and not limitation, where the patient monitoring system 10 utilizes a mobile monitoring unit 16, the camera 40 for the mobile monitoring unit 16 can capture images of the care space. These images, as discussed herein, are separated into the buffered sections 46 of video. Within each of the buffered sections 46 of video, the field segmentation network 106 identifies those portions of the care space that can be referred to as the field or background of the care space indicative of stationary objects 170. These static portions of the care space are not generally movable or are infrequently moved. Contemporaneously, the movement segmentation network 108 identifies those portions within the care space that are moving. These portions of the space can include, but are not limited to, the patient 14 and their clothing and visible body parts, portions of the bed 78 (covers, pillows, rails), medical devices such as tubes, sensors and the associated wires that may be attached to the bed 78 and/or the patient 14. The field segmentation network 106 and the movement segmentation network 108 cooperate to identify various data points 50 within the buffered sections 46 of video that can be used to determine the relative location of the patient 14 within the care space as well as the relative distances between the patient 14 and portions of the care space. The proximity of the various data points 50 determined by the field segmentation network 106 and the movement segmentation network 108 can determine whether a patient 14 is vertical, horizontal, moving through the care space, or other similar information. Where the movable objects analyzed by the movement segmentation network 108 overlap of cover the stationary objects 170 analyzed by the field segmentation network 106, the processor 48 monitors the movement of the various objects in the care space, including the patient 14. This information is also compared with the data points 50 derived through the other estimation networks 54. As discussed herein, the field segmentation network 106 and the movement segmentation network 108 are typically operated in combination with the other estimation networks 54 to provide confirmation of the indications provided by the various data points 50 of the other estimation networks 54.

Figure 8:
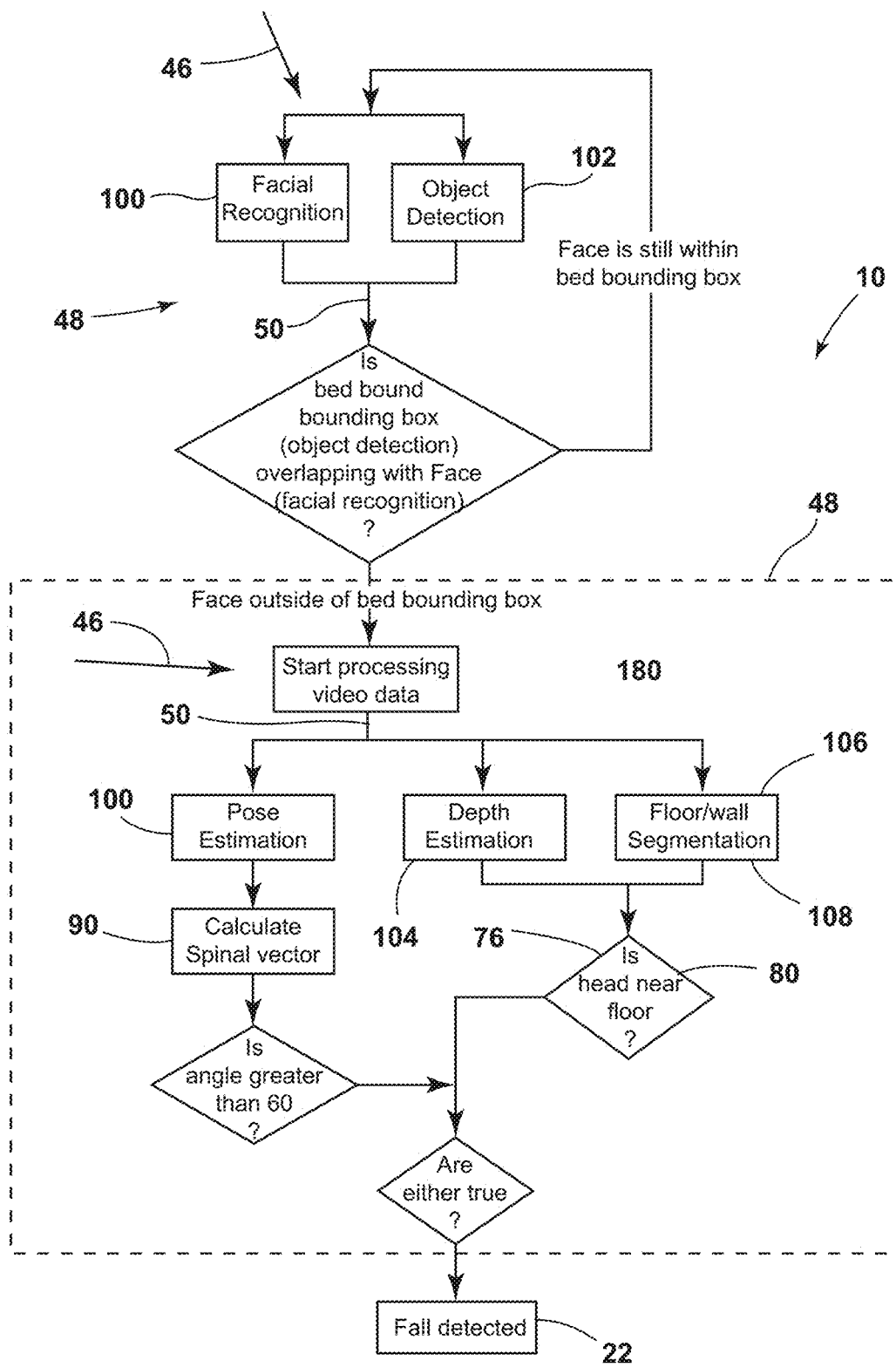
FIG. 8 is a schematic diagram illustrating a multi-tiered process for monitoring a patient and also activating a video analysis network for determining whether an adverse event has occurred.
Figure 9:
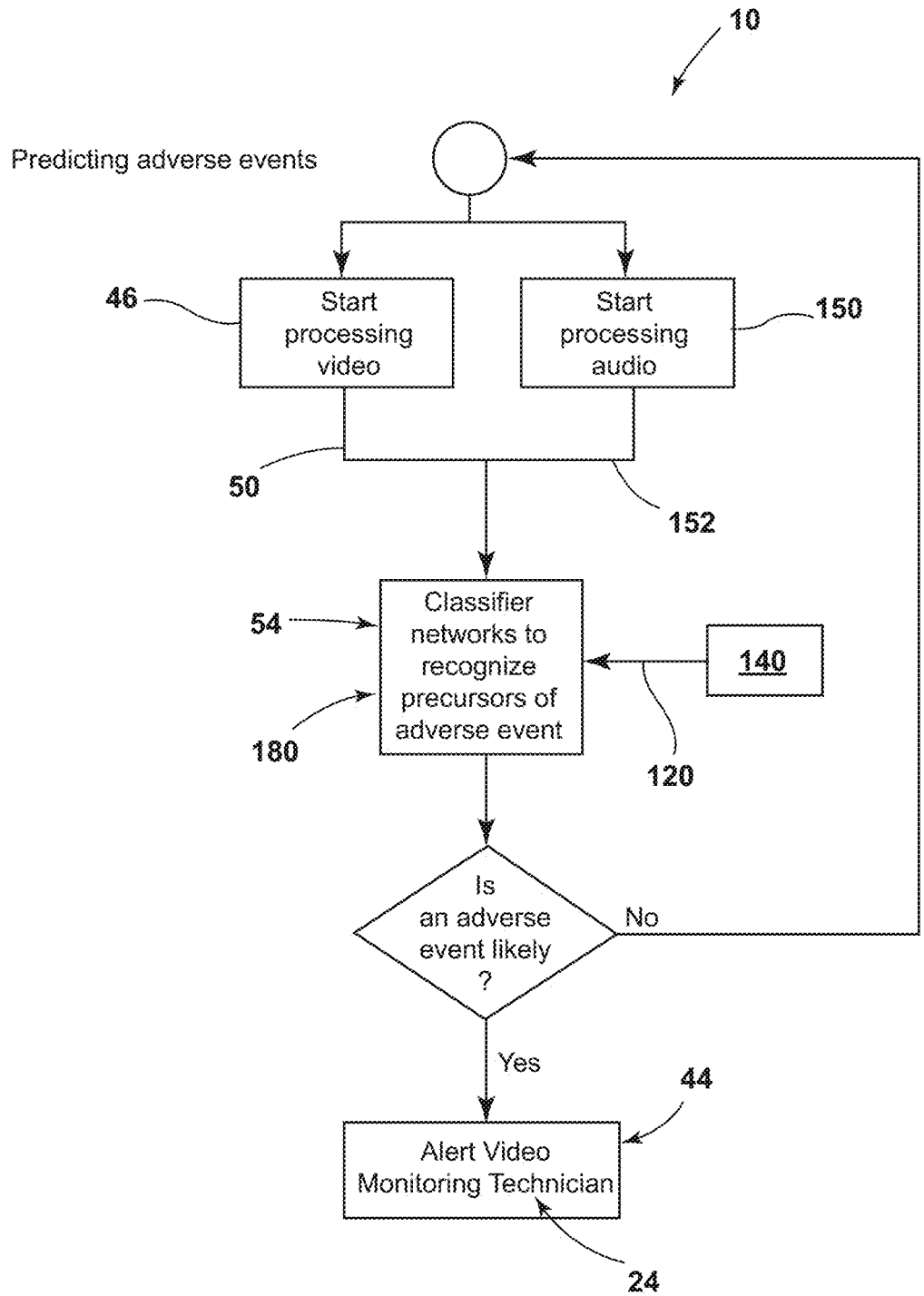
FIG. 9 is a schematic diagram illustrating a method for utilizing multiple estimation networks in combination with previously determined data points for predicting when an adverse event is likely to occur.
Figure 10:
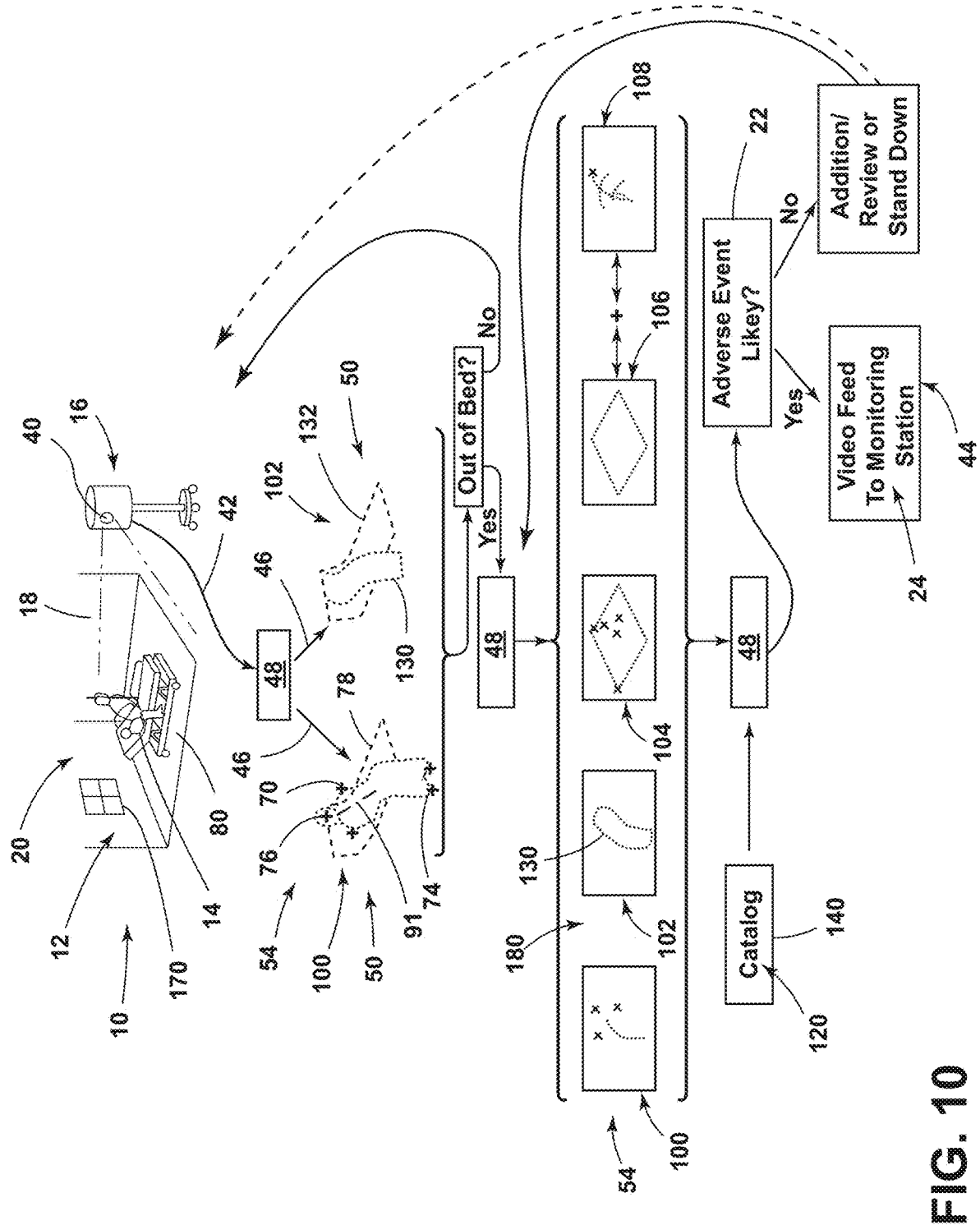
FIG. 10 is a schematic diagram illustrating a process for monitoring a patient and predicting when an adverse event is likely.

Referring now to FIGS. 8 and 9, the patient monitoring system 10 can be utilized as a tool for monitoring the current status of the patient 14 within the care space. Accordingly, the patient monitoring system 10 and the various estimation networks 54 can be utilized in a cooperative manner to observe events within the care setting 12 to determine whether an adverse event 22 has occurred. The estimation networks 54 cooperate to form a rapid response mechanism that can be used to detect the occurrence of an adverse event 22 at its most initial stages. The multiple estimation networks 54 operate to verify the observations of the other estimation networks 54 to minimize the occurrence of an adverse event 22, the occurrence of a false reading or the incorrect absence of a detection related to an adverse event 22. In addition, the patient monitoring system 10 can be used as a predictive tool for monitoring the patient 14 and determining when an adverse event 22 is likely to happen in the future. As discussed herein, an initial step in the use of the patient monitoring system 10 is determining when the patient 14 is out of bed 78 or attempting to get out of bed 78. Use of the pose estimation network 100 for monitoring the locations of various generic data points 50 of the patient's body help to determine the orientation and position of the patient's body within the care space. This pose estimation network 100, in combination with the object detection network 102, can be used for providing multiple sets of data points 50 that can be used in combination to determine the position of the patient's body with respect to the bed 78 and other objects within the care space. Using these estimation networks 54 in combination, it can be determined when the patient 14 is out of bed 78 or attempting to get out of bed 78. Once it is determined that the patient 14 is at least attempting to get out of bed 78, the patient monitoring system 10 can activate additional estimation networks 54. These additional estimation networks 54 provide additional layers 180 of data points 50 that can be used in conjunction with one another for determining whether a patient 14 is undertaking some innocuous action, such as going to the restroom or picking up an object from the floor 80, or whether the patient 14 is in some form of distress or is taking any action that may be unsafe for the patient 14. In certain instances, any actions by the patient 14 in getting out of bed 78 may be unauthorized, such as where the patient 14 is determined to be a fall risk due to lack of balance, disorientation or other conditions.

As the processor 48 operates the various estimation networks 54, these layers 180 of data points 50 are compared with one another to determine the position of the patient 14 within the care space, and also determine the relative positions and distances of the patient 14 to objects within the care space. This information is used for determining whether the patient 14 is about to fall, has fallen or is in little to no danger of an adverse event 22.

During operation of the patient monitoring system 10, after it has been determined that the patient 14 is attempting to get out of bed 78, the processor 48 utilizes the pose estimation network 100 for determining various generic data points 50 of a patient's body. As discussed herein, these generic data points 50 are utilized for extrapolating the position of the spine 90 of the patient 14. When the relative location of the spine 90 is determined, the processor 48 can utilize the pose estimation network 100 for determining the angle of the spine 90 as well as changes in the position or angle of the spine 90 over time. Contemporaneously, the processor 48 utilizes the relative depth network 104 for determining and locating various data points 50 related to the movement and velocity of movement of the body parts of the patient 14 within the care space. In particular, the relative depth network 104 can be used to determine the velocity of the patient's head 76 through the care space as well as the relative velocity with respect to various objects within the care space, such as the floor 80. Also, the processor 48 utilizes the objects detection network for calculating data points 50 related to a boundary line 130 that encircles the patient 14. As discussed herein, the shape of this boundary line 130 can indicate whether the patient 14 is in a vertical position, a horizontal position or moving between a horizontal and vertical position or vice versa. Similarly, the field segmentation network 106 and the movement segmentation network 108 operate to determine data points 50 that correspond to the relative positions of the patient 14 and static features of the care space.

Utilizing these various estimation networks 54, a finding of a single estimation network 54 that a patient 14 has experienced an adverse event 22 or is about to experience an adverse event 22 can be confirmed through the use of the other cooperative estimation networks 54. The patient monitoring system 10 can be calibrated such that the finding of an adverse event can activate the processor 48 to deliver the video feed 42 to the monitoring station 44 for closer observation of the patient 14. In certain aspects, it is contemplated that the patient monitoring system 10 such that at least two estimation networks 54 must indicate the existence or probability of an adverse event 22 as well as confirmation of that adverse event 22. Once this finding and confirmation has occurred, the processor 48 can deliver the video feed 42 to the monitoring station 44 so that the patient 14 can be placed under closer observation.

Additionally, the various estimation networks 54 can also be used to determine that an adverse event 22 has occurred and provide an expedient response from hospital staff or other caregivers. In particular, the estimation networks 54 can be used to determine whether an adverse event 22, such as a fall, has occurred such that the patient 14 is in distress and needs immediate assistance. As exemplified in FIG. 9, the various networks can be used for various layers 180 of data points 50 that can be used cooperatively for determining the current status of the patient 14 in a particular care space. As discussed herein, these captured data points 50 can be compared against previously stored sets 120 of data points 50 from the same patient 14 as well as a plurality of other patients 14.

Over the course of time, the patient monitoring system 10 captures various data points 50 that correspond to various generic locations on the body of a patient 14. Again, the generically derived data points 50 are merely assigned to particular locations on a body of a patient 14 for ascertaining the character and nature of certain movements without capturing enough information that might be used to ascertain the identity or any personal identifying characteristics of a particular patient 14. These data points 50 are stored into the catalog 140 or library of previously stored sets 120 of data points 50 for comparison in the future.

The various estimation networks 54 operated by the processor 48 for utilizing the patient monitoring system 10 can be determined and ascertained as the buffered sections 46 of video are utilized by the processor 48. In addition, the various data points 50 captured by the processor 48 through the analysis of the buffered sections 46 and video can also be compared with previous and similarly situated data points 50 from the catalog 140 of previously stored sets 120 of data points 50. This comparison provides various prediction models for events that are likely or unlikely to happen in the future. Where a number of prediction models are possible based upon the captured data points 50 from the buffered section 46 of video, the processor 48 can place percentages or degrees of likelihood on certain predictive models based upon the previously stored data points 50. As additional information is collected through the processing of subsequent buffered sections 46 of video, a larger sample size can be used from comparison with the previously stored sets 120 of data points 50. Accordingly, the processor 48 can filter or narrow the various predictive models to arrive at one or a narrow set of events that are more likely than not to occur in the future.

By way of example, and not limitation, after a particular buffered section 46 of video is processed and analyzed, the processor 48 may determine that fifty (50) particular predictive models are applicable to the ascertained data points 50, based upon a review of the previously stores sets of data points 50. Where none of these models have a particularly high likelihood of occurrence (i.e., below 50 percent, 30 percent or 10 percent), additional data points 50 are collected through an analysis of subsequent buffered sections 46 of video. As additional sections of buffered video are analyzed by the processor 48, these fifty (50) predictive models can be filtered over time. Evaluation of additional buffered sections 46 of video may result in ten (10) predictive models. Moreover, analysis of additional buffered sections 46 of video may narrow this result down even farther such that three predictive models, for instance may be the most likely. Additionally, these likely predictive models can also be scored based upon a percentage of likelihood or other scoring mechanism, where a particular predictive model exceeds a certain threshold (i.e., 66 percent, 80 percent, or other similar threshold). The processor 48 can determine what the most likely predictive event is. Where this predictive event is likely to occur is an adverse event 22, the processor 48 can deliver the video feed 42 to the monitoring station 44 so that the patient 14 can be placed under closer observation through the offsite observer 24. It should be understood that the percentages and thresholds described herein are exemplary in nature and various thresholds of various sensitivity can be utilized depending upon the needs of the user of the patient monitoring system 10.

In addition, when the predictive modeling function of the patient monitoring system 10 determines that an adverse event 22 is likely or imminent, the patient monitoring system 10 can also alert hospital staff of this event such that one or more members of the hospital staff can be alerted to the patient 14 to provide closer observation. Moreover, when it is determined that an adverse event 22 is more likely, the resolution of the buffered sections 46 of video may be adjusted. By way of example, instead of the processor 48 analyzing a buffered section 46 of video with 100 frames, the processor 48 may analyze a buffered section 46 of video with 15 frames of video. In such an aspect, more rounds of analysis are set over a particular period of time so that a more refined estimation and analysis can occur, when needed most.

According to various aspects of the device, the patient monitoring system 10 can be utilized as an assessment tool for patients 14 that have been admitted to a hospital or other care space. By way of example, and not limitation, the patient monitoring system 10 can monitor the movements and actions of a newly admitted patient 14 by capturing the various data points 50 and layers 180 of data points 50 as described herein. These data points 50 can be evaluated and analyzed to assess whether the patient 14 presents a fall risk, presents a risk of other adverse events 22, or presents a relatively low risk of adverse events 22. Once this evaluation is complete, the monitoring unit 16 for the patient monitoring system 10 can either be left in the care space or can be moved to another care space where the monitoring unit 16 may be more needed. Use of the patient monitoring system 10 as an evaluation tool can provide criteria where a patient 14 may act differently where they know they are being directly observed by a doctor or another member of a care facility. The use of this objective data can be useful in monitoring the status of a particular patient 14, as well as the likelihood of an adverse event 22 occurring.

Referring again to FIG. 3, it is contemplated that the patient monitoring system 10 can include a monitoring unit 16 that can include a microphone 190, speaker 192, display 194 and other sensory equipment. This sensory equipment can be used for monitoring the patient 14, but can also be used for various telecommunication purposes. By way of example, and not limitation, the monitoring unit 16 can be used as a telecommunications device 196 to allow the patient 14 to speak with healthcare providers, staff of the facility and other members of their healthcare team. In addition, the telecommunications features of the monitoring unit 16 can also be used as a telecommunications device 196 to allow the patients 14 to communicate with friends, family members and other individuals. This connectivity and interactive resource of the patient monitoring system 10 can provide a communications outlet for patients 14 that may be quarantined or otherwise placed in isolation for any number of reasons. It is contemplated that these telecommunications may or may not be recorded. Where the telecommunication is with a member of the hospital staff or the patient's care team, these communications may be recorded for the benefit of the patient 14 and also for record keeping. As described herein, such information is stored within a memory 52 that is entirely separate from the memory 52 that retains the data points 50 and the previously stored sets 120 of data points 50. Where the patient 14 is communicating friends, family, and people outside of the healthcare team, these communications are not typically recorded. It is contemplated that the audio and video portions of these communications can be analyzed through the processor 48 to arrive at the various data points 50 described herein. In particular, a plurality of auditory data points 154 can be utilized for gauging a condition, temperament and movement of the patient 14. In providing this analysis, individual words and phrases may not be recorded, but may be assigned generic identifiers that correspond to the volume, tenor, pattern, and cadence of speech. These data points 50 can be utilized for determining whether the patient 14 is in distress, is irritated or is otherwise out of sorts.

According to various aspects of the device, as the processor 48 for the patient monitoring system 10 evaluates the various buffered sections 46 of video to determine the plurality of data points 50, the data can be delivered from the camera 40 to a separate system for processing. This separate system can be used as a dedicated system that can be outside of the hospital's facilities so that processing speed can be specifically allocated to the review and analysis of the buffered sections 46 of video according to the patient monitoring system 10. Once the data points 50 are converted, the buffered section 46 of video can be delivered to the monitoring station 44 and the data points 50 can be delivered to a particular storage memory 52 for analysis and later use.

Referring to FIGS. 1-3 and 11, the system 10 can include a server 200 configured to store and to provide data related to monitoring of the patient 14. The server 200 can include one or more computers that may include virtual machines. The server 200 also includes a first communication interface 202 configured to communicate with the monitoring unit 16 and/or monitoring station 44 via a first network 204. In some embodiments, the first network 204 may include wired and/or wireless network connections, including Wi-Fi, Bluetooth, ZigBee, Near-Field Communications, a cellular data network, and the like. As a non-limiting example, the first network 204 may operate locally to a medical facility (e.g., a local network of a hospital). The server 200 includes a first processor 206 and a first memory 208. The first memory 208 includes first instructions 210 that, when executed by the first processor 206, are operable to calculate and/or determine various data related to monitoring of the patient 14. The server 200 is configured to store data related to monitoring of the patient 14. For example, the first memory 208 includes a database 212 configured to hold data, such as data pertaining to monitoring of previous patients. An artificial intelligence engine 214 may be provided for interacting with the data stored in the first memory 208 when performing various techniques, such as generating various machine-learning models 216. The models 216 may be trained to predict an adverse event 22 for a patient 14. For example, the data can include cohort data of other or previous patients having similar experiences prior to the occurrence of an adverse event 22. The models 216 may be trained on this data in order associate certain data points 50 with the adverse event 22.

The one or more machine learning models 216 may comprise a single level of linear or non-linear operations and/or the machine learning models 216 may be trained via a deep network, i.e., a machine learning model comprising multiple levels of non-linear operations. Deep networks may include neural networks 266 including generative adversarial networks, convolutional neural networks, recurrent neural networks with one or more hidden layers, and fully connected neural networks 266.

The server 200 may include a training engine 218 capable of training the models 216 based on initial data, as well as feedback data via the monitoring station 44. The training engine 218 may include a rackmount server, a personal computer, a smartphone, an Internet of Things (IoT) device, or any other desired computing device. The models 216 may be trained to match patterns of a first set of parameters (e.g., information related to body parts and/or body movements). The one or more machine learning models 216 may be trained to receive the first set of parameters as input, map or otherwise associate or algorithmically associate the first set of parameters to the second set of parameters associated with an adverse event 22, such as a fall of the patient, a patient pulling tubes, etc.

The server 200 may also be in communication with a second network 220. The second network 220 may be configured similar to or different than the first network 204 in terms of protocol. However, according to some non-limiting examples, the second network 220 may be operable to communicate with a plurality of medical facility networks (e.g., a plurality of first networks 204), as demonstrated by communication node 221. According to this aspect of the disclosure, the second network 220 may be a "global" network requiring security access information different from security access information required to access the first network 204. Via the communication node 221, the second network 220 may allow the server 200 to harvest data from a plurality of monitoring stations 44 and/or monitoring units 16 distributed across a plurality of first networks 204 each associated with a different medical facility or medical professional network.

The monitoring station 44 includes a second communication interface 222 configured to communicate with the server 200 via the first network 204. The monitoring station 44 can include one or more computers that may include virtual machines. The monitoring station 44 includes a second processor 224 and a second memory 226. According to some aspects, the second processor 224 may be the same processor 48 discussed throughout the disclosure. Further, the second memory 226 may be the same memory 52 described herein. The virtual data points 50 and the estimation networks 54 may therefore be stored in the second memory 226. The second memory 226 includes second instructions 228 that, when executed by the second processor 224, are operable to calculate and/or determine various data related to patient monitoring. The monitoring station 44 is configured to store data related to patient monitoring. For example, the second memory 226 includes a second database 230 configured to hold data, such as data pertaining to previous patient monitoring. The data stored in the second database 230 may be periodically updated with, synchronized to, or otherwise similar to the data stored in the first database 212. In this way, the monitoring station 44 may operate as a standalone system that interacts with the monitoring unit 16. It is generally contemplated that the second memory 226 may include models similar to the models 216 stored in the server 200, or other similar models.

The monitoring station 44 may include a buffer module 232 in communication with the second processor 224 and configured to buffer image data communicated from the monitoring unit 16. The buffer module 232 may interpose the second communication interface 222 and the second processor 224. An interface 234 may be provided with the monitoring station 44 for displaying buffered image data. The interface 234 may take one or more different forms including, for example, a computer monitor or display screen on a tablet, a smartphone, etc. The interface 234 may incorporate various different visual, audio, or other presentation technologies. For example, the interface 234 may include a non-visual display, such as an audio signal. The interface 234 may include one or more displays 194 presenting various data or controls.

According to some aspects of the present disclosure, a system 10 for predicting an adverse event 22 for a patient 14 includes one of the first database 212 and the second database 230 including a first data point 50 related to a first or previously observed care setting 12 of a previously observed patient. This can correspond to the previously stored sets 120 of data points 50. A camera 40 is configured to capture image data corresponding to a second or current care setting 12 for the patient 14. A display 194, such as interface 234, is in communication with the camera 40 for presenting the image data. A processing device (e.g. first processor 206 and/or second processor 224) is communicatively coupled with the camera 40 and at least one of the first and second databases 212, 230. The processing device is configured to determine, based on the image data, a second or current data point 50 related to the current care setting 12 within which the patient 14 is being observed. The processing device may also be configured to compare the first data point, or the previously stored sets 120 of data points 50 to the second or currently derived data point 50. The processing device is configured to determine, based on the comparison of the first data point to the second data point, adverse event data corresponding to the adverse event 22. The adverse event data includes probability data corresponding to a likelihood of the adverse event 22. The processing device is configured to communicate an instruction to present the probability data on the display 194. According to some aspects of the present disclosure, the probability data is operable between a warning state and a safe state. The warning state corresponds to a higher likelihood of the adverse event 22 and the safe state corresponds to a lower likelihood hood of the adverse event 22. In the warning state, the video feed 42 can be delivered to the monitoring station 44 and the offsite observer 24. In the safe state, the video feed 42 may or may not be delivered to the monitoring station 44 and the offsite observer 24.

Referring now to FIGS. 12-16, the patient monitoring system 10 may include an elopement detection system 240. The system 240 may utilize the previously-described hardware/software features shown and described with respect to the preceding figures or may be a separate implementation. For example, in addition to the features described above with respect to the adverse event detection features, the monitoring unit 16 may include one or more audio or video capturing devices 244, 246 configured to capture image data of objects, such as patients 14, visitors, beds, or other items in a medical setting, similar to or the same as the aforementioned camera 40 and microphone 190. The data may then be communicated to at least one observer client 247.

Figure 12:
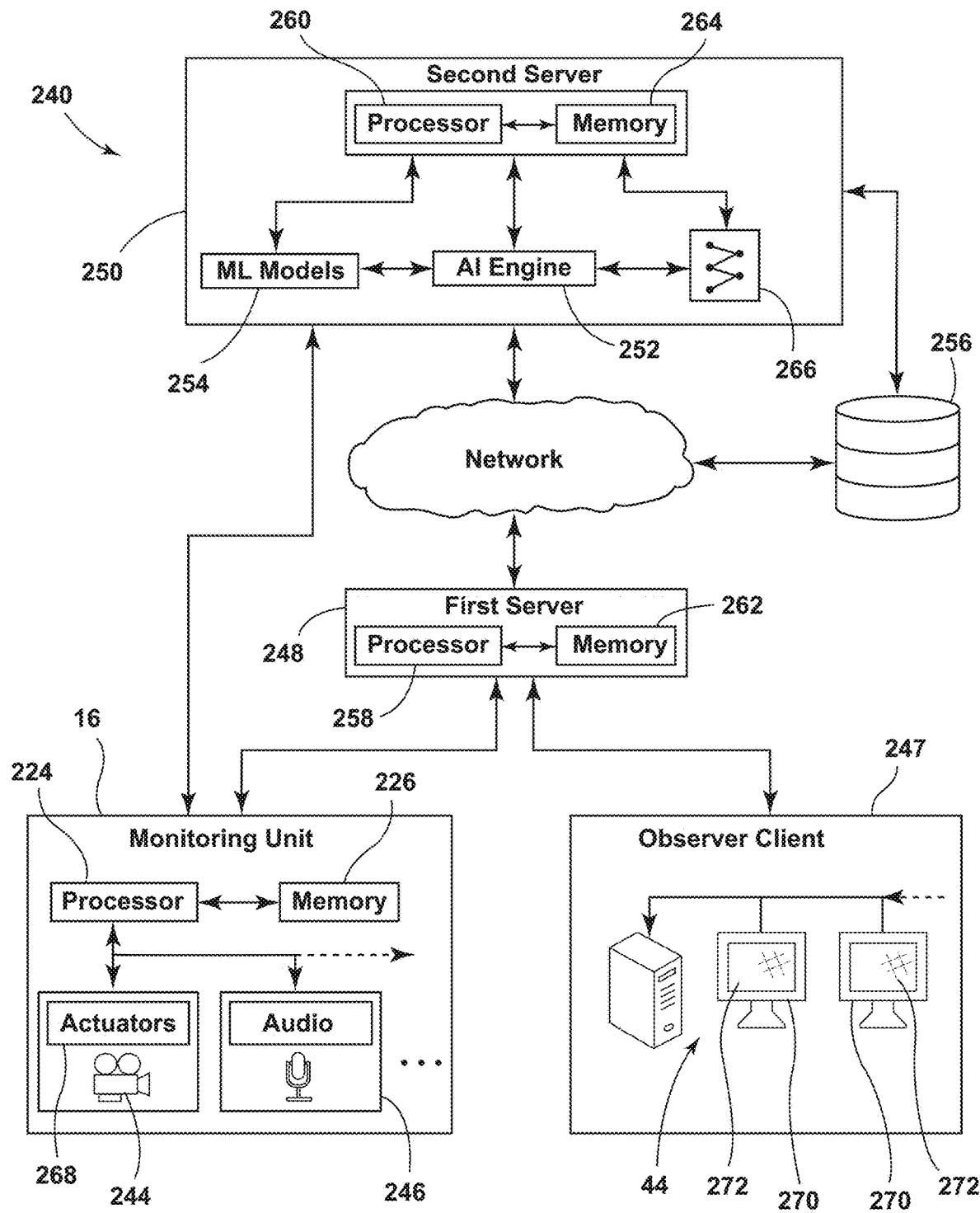
FIG. 12 is a schematic diagram of as aspect of the patient monitoring system.

In the present example shown in FIG. 12, the elopement detection system 240 typically includes at least one server 248, 250 that is configured to process the captured data to identify objects in a medical environment and/or determine a state of the objects in order to alert the observer client 247 to an elopement condition. For example, the at least one server 248, 250 may include a first server 248 that is configured to communicatively interpose the observer client 247 and/or the monitoring unit 16 and a second server 250. As described herein, the observer client 247 can be the interface through which the offsite observer 24 observes the relevant information from the patient monitoring system 10 and the elopement detection system 240.

Figure 11:
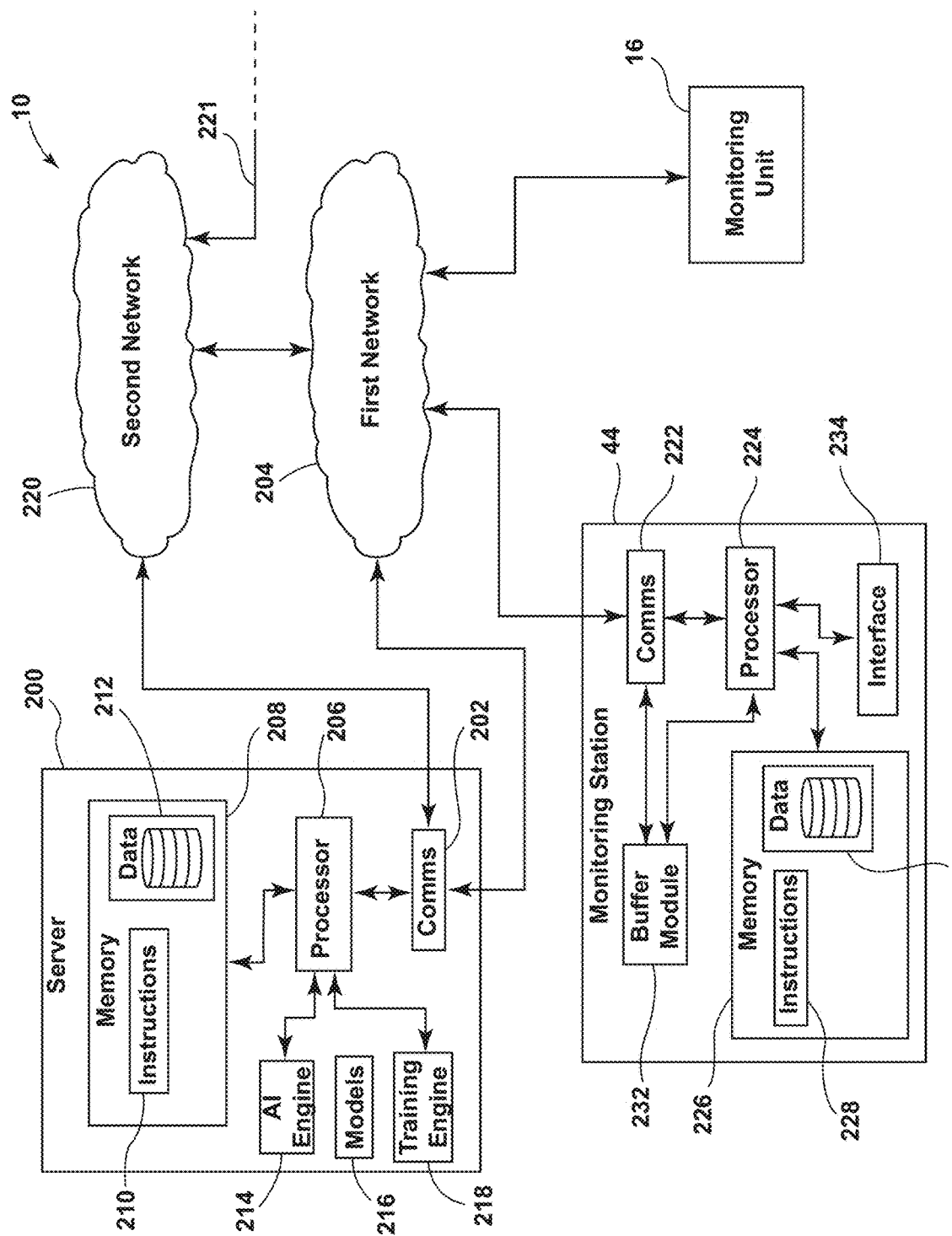
FIG. 11 shows a block diagram of the patient monitoring system according to one aspect of the present disclosure.

Referring again to FIG. 12, the second server 250 may operate similar to or the same as the server 200 previously described with respect to FIG. 11. For example, the second server 250 may include one or more artificial intelligence engines 252 that are configured to train one or more machine learning models 254 to detect the elopement condition based on historical data stored in a database 256 that is in communication with the AI engine 252 and the second server 250. The first and second servers 248, 250 may include first and second processors 258, 260, respectively, that may execute instructions stored in memories 262, 264 (e.g., a first memory 262 and a second memory 264) in each of the first and second servers 248, 250. The instructions stored in the memories 262, 264 may relate to generating new stream handling requests, for example, from the first server 248 to the second server 250, closing certain data streams related to individual medical environments (e.g., patient care settings 12), modifying data streams between the first and second servers 248, 250 and/or the observer client 247, and the like.

In the example in which the second server 250 includes AI functionality, the AI engine 252 may process the image/video/audio data captured by the monitoring unit 16 through the machine learning models 254 to generate a message or data points 50, such as a string, binary values, or other data classifier to communicate back to the first server 248 and/or to communicate to the monitoring unit 16. For example, as will be further described in reference to the proceeding figures, the message may include an indication of elopement, a command to control the monitoring unit 16, or another response.

As illustrated in FIG. 12, the monitoring unit 16 may include one or more electromechanical actuation devices 268, such as motors, to perform the PTZ operability. These motors or other actuators are configured to adjust a viewing angle of the audio and/or video capturing devices 244, 246 with respect to the medical environment in response to the messages received from the at least one server 248, 250. For example, the at least one electromechanical actuator 268 may include three motors (e.g., a first actuator, a second actuator, a third actuator) that are configured to control a pan function, a tilt function, and a zoom function for at least the image capturing devices 244 of the monitoring unit 16. Although not illustrated in detail, it is contemplated that various gearing mechanisms may be incorporated between the electromechanical actuation devices 268 and the image capturing devices 244. Thus, instructions communicated by the observer client 247 to the at least one server 248, 250 may result in one or more instructions being communicated to the monitoring unit 16 to adjust the monitoring unit 16 to track the patient or another object in the medical environment based on determination of the elopement condition.

It is contemplated that the observer client 247 may incorporate similar computational structures as described in relation to the first and second servers 248, 250 and/or the servers previously described in relation to the preceding figures, such as the processors 258, 260, memories 262, 264, AI engine 252, and machine learning models 254. For example, virtual machines, local databases, and the like can be included or can be in communication with the observer client 247. As will be described further below, the at least one observer client 247 can include a screen, such as a monitor 270, an RGB display, or the like, for displaying the video/image data. Although not shown, it is contemplated that the observer client 247 can further incorporate one or more audio output devices, such as speakers, for outputting audio data captured by a microphone 190 of the monitoring unit 16. Additionally, the observer client 247 can include a microphone 190 that can be used to provide a one-way or two-way communication interface.

Figure 13:
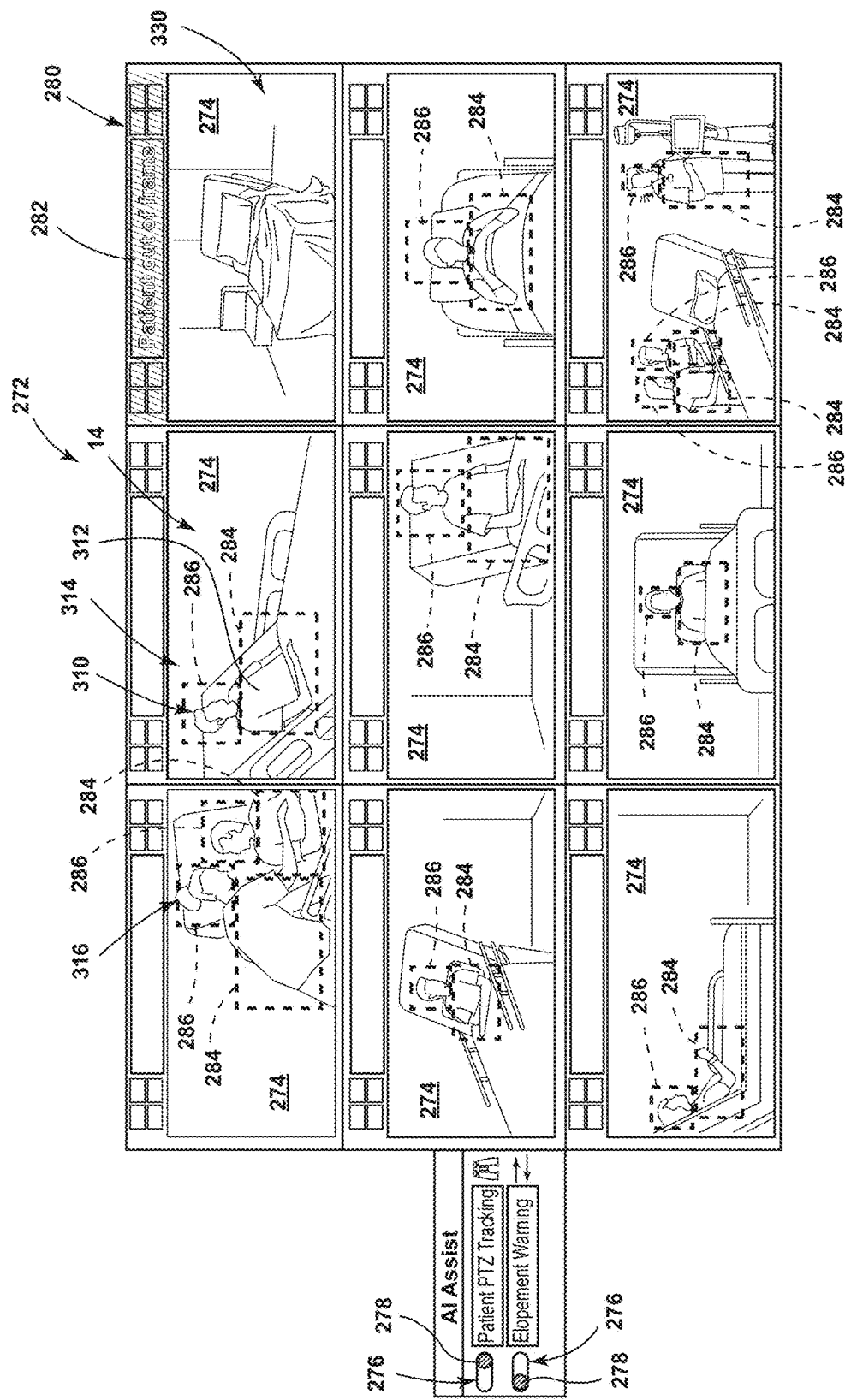
FIG. 13 is a schematic diagram of an aspect of the patient monitoring system that uses tracking features of occupants of a patient care space to track movements of the occupants.

Referring now more particularly to FIG. 13, an exemplary display 272 for the observer client 247 is illustrated with a plurality of tiles 274 corresponding to a plurality of care settings 12 that correspond to a plurality of individual patient 14 rooms of one or more treatment facilities and/or one or more home care settings 12. The display 272 may be presented, for example, at the screen 270 previously described in relation to FIG. 12 and may include one or more objects 276 that allow for user interfacing to control various monitoring functions for the elopement detection system 240. For example, a digital toggle switch 278 may be incorporated for enabling one or both of active tracking of the patient 14 in the medical environment and/or enablement of the elopement detection system 240. More particularly, the user, such as the offsite observer 24, may selectively enable presentation of an alert message (e.g., a warning 282) of the elopement condition on the display 272 and/or selectively enable the one or more servers to control movement of the monitoring unit 16, such as the pan function, the tilt function, and/or the zoom function (PTZ function). In operation, the offsite observer 24 may select, via a user input device such as a mouse, a touch input on a touchscreen, a user input to a keyboard, or the like by toggling the at least one object 276 after selecting (via a similar input mechanism) one of the plurality of tiles 274. In this way, PTZ tracking and/or elopement detection enablement may be controlled on a care setting 12-by-care setting 12 basis. In other examples, the at least one object 276 may control monitoring and/or enablement of either feature for all of the tiles 274/medical environments. In certain aspects of the device, the PTZ tracking can be linked or assigned to a particular individual, typically the patient 14. The PTZ tracking can then be automatically operated, via the various actuators, to track the patient 14 within and with respect to the care setting 12 for the patient 14.

Still referring to FIG. 13, an indicator 280 may be configured to be presented for each tile 274 in response to detecting the elopement condition and/or a pre-elopement condition. For example, in the tile 274 shown at the top right of FIG. 13, the elopement indication 330 may be a text and/or color presentation of the warning 282 that a previously detected patient 14 is no longer in frame of the monitoring unit 16. This condition may correspond to an elopement condition or a pre-elopement condition upon which the PTZ tracking, if enabled, would result in adjustment to the PTZ tracking functions of the image capturing devices 244.

It is contemplated that although nine tiles 274 are illustrated corresponding to nine separate medical environments, it is contemplated that any number of tiles 274 may be presented at the display 272 depending on user preference, software modes, or the number of care settings 12 and patients 14 being monitored.

Referring now to FIGS. 12-16, the elopement detection system 240 may present, as part of the display 272, tracking features 284, 286 overlaid over the image data captured by the monitoring unit 16 to indicate or flag inconsistencies based on derived or determined expectations of the elopement conditions. For example, a first tracking feature 284, as illustrated in the middle tile 274 of the display 272, may include a geometric overlay 288 that corresponds to one or more aspects of the clothing 312 of a person in the care setting 12, such as the patient 14. A second tracking feature 286 may track one facial feature 310 or a combination of facial features 310 of the patient 14. This second tracking feature 286 can encompass or otherwise align with the face of the corresponding person, typically the patient 14.

Referring again to FIGS. 12-16, according to various aspects of the device, where multiple people are present in the care setting 12 for the patient 14, the first and second tracking features 284, 286 can be used to track the patient 14 as well as any additional people (non-patients 316) in the care setting 12. In addition to tracking components of clothing 312 and combinations of facial features 310, the elopement detection system 240 of the patient monitoring system 10 can also associate the tracked components of clothing 312 with the tracked facial features 310 with respect to dedicated individuals, such as the patient 14. In this manner, using the first and second tracking features 284, 286, the elopement detection system 240 can distinguish the patient 14 from non-patients 316, such as visitors or hospital staff, that may be present in the care setting 12 for the patient 14. Additionally, the elopement detection system 240 can maintain this confirmed association 314 to verify that the patient 14 is in the care setting 12. Where this confirmed association 314 cannot be verified, changes, or no longer matches, such as where the patient 14 changes clothing from a hospital gown 362 to street clothes, such as shirt 356 and pants 360, the elopement detection system 240 can provide an alert, such as the elopement indication 330, regarding the disassociation. This disassociation or mismatch with respect to components of clothing 312 and facial features 310 can result in an alert or warning or can trigger a heightened monitoring routine for the patient monitoring system 10 and the elopement detection system 240.

It is contemplated that the tracking features 284, 286 presented in the exemplary display 272 may be selectively hidden, muted, or omitted in some examples, in order to allow a clean presentation of the image data to the observer client 247 and, thus, an offsite observer 24. The tracking features 284, 286 may be employed for detecting mismatch conditions between clothing 312 and facial features 310 of a confirmed association 314, and other identification information, as will be described further below.

Figure 14:
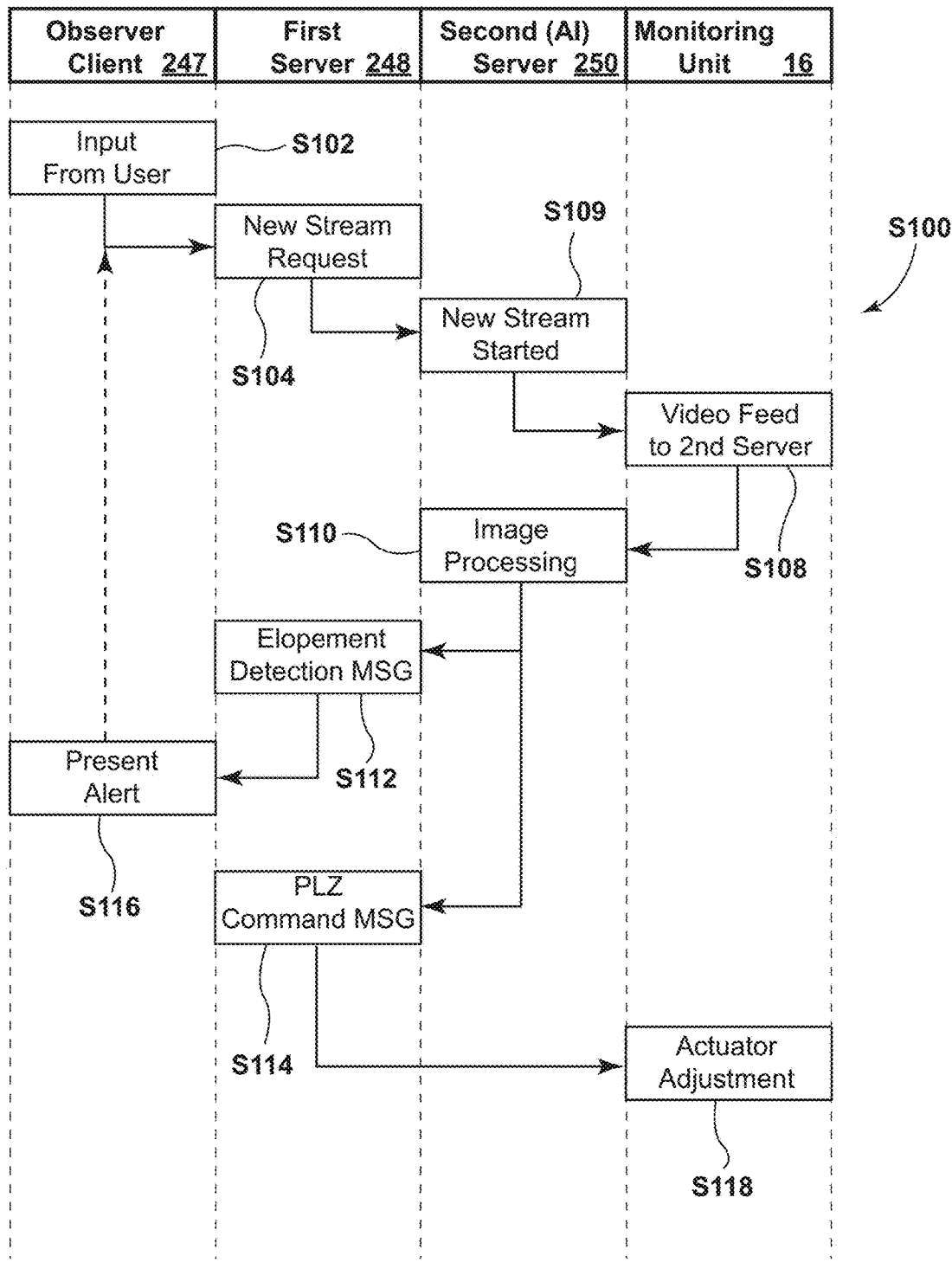
FIG. 14 is a schematic diagram of an aspect of the patient monitoring system that incorporates an elopement detection feature.
Figure 15:
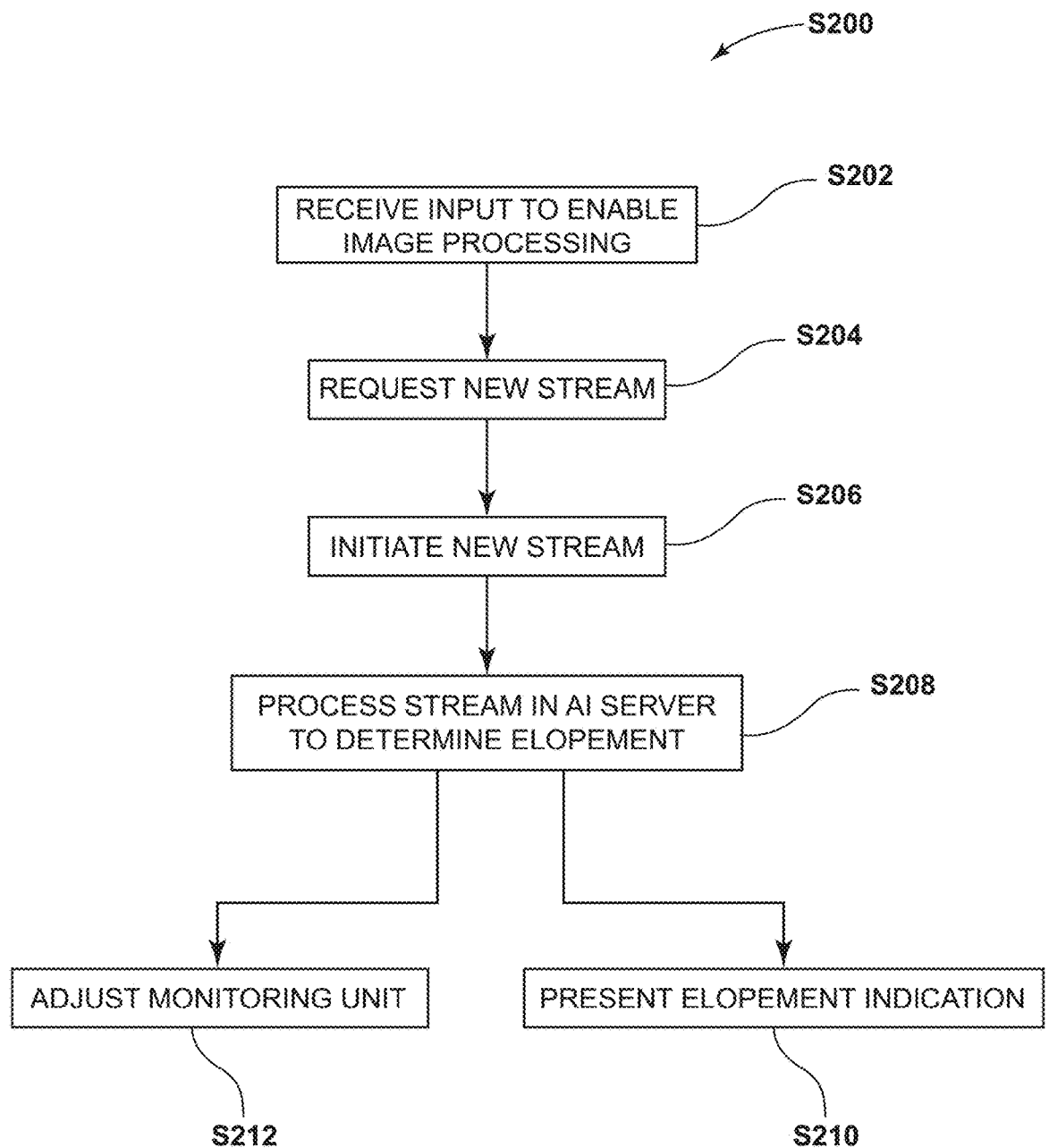
FIG. 15 is a schematic flow diagram illustrating a method for operating an elopement detection feature of the patient monitoring system.
Figure 16:
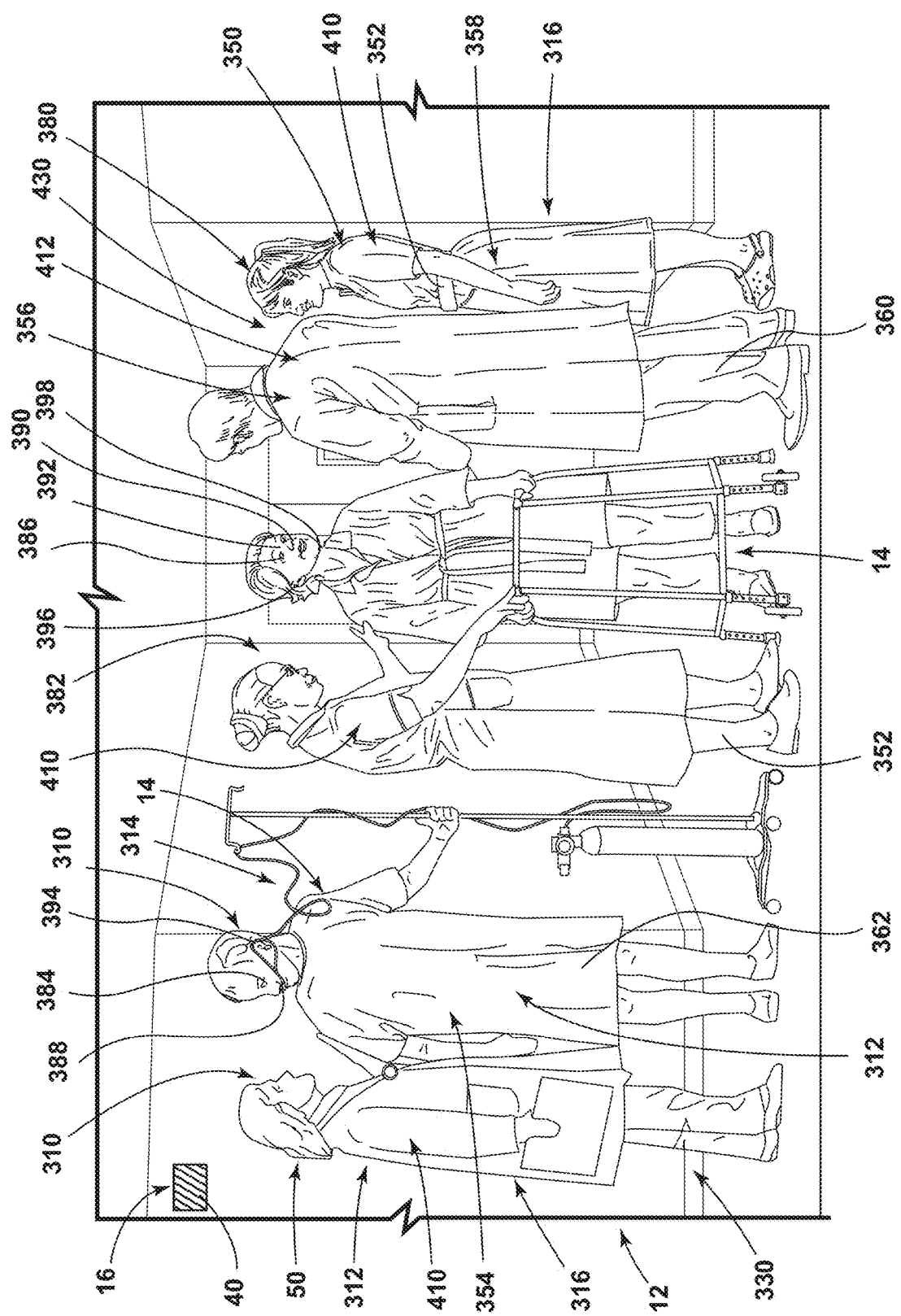
FIG. 16 is a schematic diagram of an aspect of the elopement detection system.
Figure 17:
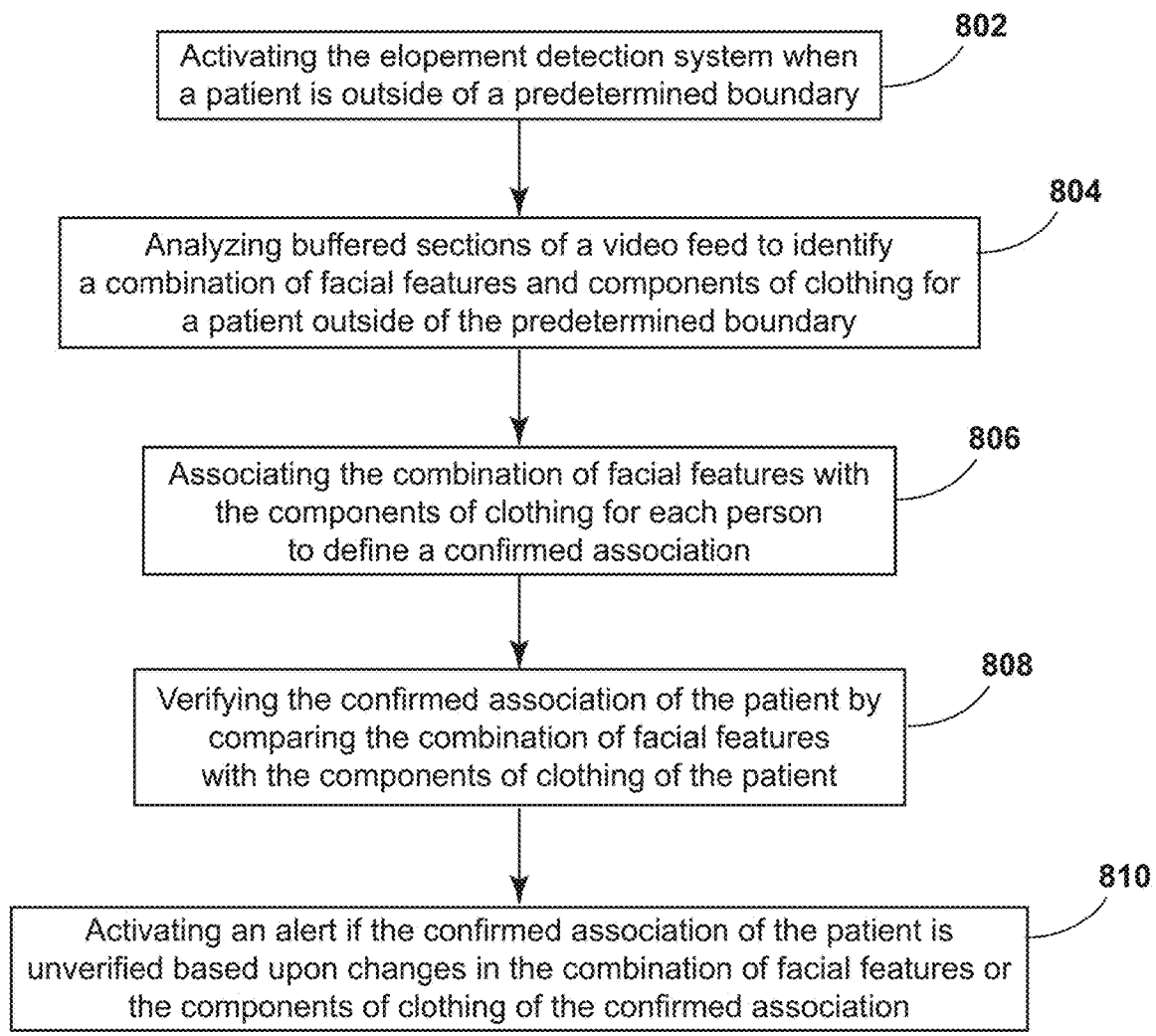
FIG. 17 is a linear flow diagram illustrating a method for operating an elopement detection system.

Referring now to FIGS. 14 and 15, the logic and data flow of the elopement detection system 240 is generally illustrated. For example, FIG. 14 generally illustrates the control and data flow process S100 amongst the various elements shown and described with respect to FIG. 12. FIG. 15 presents a method of detecting an elopement condition as performed by the elopement detection system 240 shown and described in relation to FIG. 12. With particular reference to FIG. 14, the observer client 247 may be configured to receive the user input via, for example, the objects 276 shown in FIG. 14, at step S102. The input may include an enablement or disablement of one or both of the PTZ tracking control and/or the elopement warning enablement functions. In response to receiving an instruction, for example, to enable one or both of these AI features, the first server 248 may generate a new stream handling request at step S104. The new stream handling request may include real-time streaming protocol (RTSP) information, URI class information, and/or feature state data to allow the second server 250 to confirm the new data stream.

At step S106, the second server 250 initiates a stream handler instance to run an inference on the image data stream from the image capturing device 244 and present at the observer client 247 in response to the request from the first server 248. As a result, at step S108, the monitoring unit 16, which captures the video data, begins providing the RTSP stream to the second server 250 to allow the second server 250 to process the image data and compare the image data to historical cohort image data (e.g., stored in the database 212, 230) to detect the elopement condition. For example, the machine learning models 254 may be trained to compare the facial features 310 identified in the image data to the clothing 312 donned by the patient 14 with the given facial features 310. Based on such comparisons, the processor 260 of the second server 250 may determine that the patient 14 is not wearing clothes 312 consistent with the previously confirmed association 314 with respect to the patient 14. The processor may also determine that the patient 14 having the tracked facial features 310 is not wearing clothing 312 that is associated with a medical environment. The result of the non-conforming determination can be a triggering of the elopement condition in response to the comparison (Step S210). This triggering can be automatic or can be at the initiation of the offsite observer 24 at the observer client 247. In other examples, the machine learning models 254 may be trained to detect fast or quick movement by the patient 14 in changing clothes 312 and/or movements directed to removal of medical monitoring equipment and correlate such actions with the elopement condition.

Referring again to FIGS. 14-16, the elopement detection system 240 can initiate a prompt to adjust the monitoring unit 16, or can automatically adjust the monitoring unit 16 where the patient 14 moves to a position that is outside of the care setting 12 monitored by the camera 40. When the camera 40 is moved to a position to place the patient 14 within the video feed 42, the elopement detection system 240 can verify the previously determined and confirmed association 314 of the facial features 310 and clothing 312 of the patient 14 to confirm that the patient 14 is within the care setting 12. When the patient 14 is not able to be placed within the video feed 42, the elopement detection system 240 can provide the observer client 247 with an elopement indication 330 and an elopement alert can be activated.

In addition, the patient monitoring system 10 is configured to maintain a database 256 of information that can be referenced in the future for identifying actions that are likely to precede an attempted elopement. Actions such as switching clothing 312 with a visitor, quickly changing clothing 312, fast movements toward an egress, and other actions may be evaluated by the elopement detection system 240 of the patient monitoring system 10 and may be determined to be indicative of an attempted elopement.

The particular elopement conditions of the present disclosure may not be limited to the previously described elopement condition examples. For example, the machine learning models 254 may be trained to detect elopement conditions based on unforeseen variables that may have no obvious logical connection to elopement conditions but may be predicted by the AI engine 252, based upon an evaluation of previously captured data. Other, more logical detections may be further refined and/or defined by the second processor 260 of the second server 250, such as a patient being out of view of the camera 40 and/or hiding of the facial features 310, clothing 312, or body to prevent detection and tracking by the monitoring unit 16.

With continued reference to FIG. 14, steps S112 and S114 may be performed by the elopement detection system 240 in response to the second server 250 determining the elopement condition and/or determining a positioning command for the image capturing devices 244 of the monitoring unit 16. For example, with respect to step S112, when elopement detection is enabled via the observer client 247, the elopement warnings 282, in the form of instructions, may be communicated to the first server 248, which may then be forwarded to the observer client 247 to be displayed within the display 272 at step S116. In this way, the first server 248 may operate as an exchange server between the observer client 247 and the second server 250. Once the warning 282 message is communicated to the observer client 247, the processor of the observer client 247 may receive the elopement warning 282 condition data, process the condition data, and display the indication (see, e.g., FIG. 13) with the image data captured by the monitoring unit 16. For example, for a given medical environment/monitoring unit 16, the elopement condition may be displayed overlaying the tile 274 associated with the particular monitoring unit 16 to which the elopement condition was detected.

With regard to step S114, if PTZ control is enabled via the observer client 247 at the object 276, the second server 250 may communicate positioning commands to the first server 248, which may then be forwarded to the monitoring unit 16 at step S118. Thus, the first server 248 may also operate as a message router for messages between the second server 250 and the monitoring unit 16. At step S120, the monitoring unit 16 adjusts the positioning of the image capturing device 244 to locate the patient 14 in the care setting 12 in the event the patient 14 is outside of the viewing angle when PTZ control is enabled. Thus, at step S120, instructions communicated by the at least one server 248, 250 may result in motor control commands to adjust, for example, a lens of the image capturing module (such as camera 40) or an axis in 3D space of the image capturing module.

As indicated in FIG. 14, the above described data/control flow may be recursive and dependent on the user input at the display 272 and/or whether or not the elopement condition or patient out of frame condition is determined by the second processor 260. For example, the user may disable the AI functionality, which may result in termination of the stream handling requests and stream handling instances. Further, it is contemplated that the steps described herein may be performed amongst a plurality of monitoring units 16 having individual stream instances managed/controlled by one or a plurality of observer clients 247. It is also contemplated that the at least one server 248, 250 may each or either incorporate a plurality of cores, with one core assigned to each instance. These examples are nonlimiting, such that any number of processors 258, 260, AI engines 252, machine learning models 254, virtual machines, or the like may be employed to operate it in the elopement detection system 240 as generally described above.

Referring now more particularly to FIG. 15, a method S200 for detecting elopement condition in a care setting 12 includes receiving, at the observer client 247, a user input to enable active patient monitoring at step S202. At step S204, the first server 248 in communication with the observer client 247 generates a new stream handling request and communicates the new stream handling request to the second server 250 that is in communication with the first server 248. In response to receiving the new stream handling request, the second server 250 communicates an instruction to the monitoring unit 16 that is in communication with the second server 250 to communicate video data captured by the monitoring device to the second server 250 at step 206. At step 208 of the method, the second server 250, via an artificial intelligence engine 252, processes the image data captured by the monitoring unit 16 in a machine learning model 254 trained to the detect an elopement condition for the patient. Based on the elopement condition, the second server 250 may communicate an instruction to the observer client 247, via the first server 248, to present an indication of the elopement condition at a display 194 of the observer client 247. In some examples, the method further includes communicating an instruction to the monitoring unit 16 to operate the actuation device of the monitoring unit 16 to adjust the viewing angle of the image capturing device 244 in response to determining one or both of the elopement condition and a patient out of view condition.

In general, the remote database 256 shown and described with respect to FIGS. 12-16 may be configured to store refined data output that includes image data sets related to patient tracking, such as tracking of motions within the care setting 12 (e.g., a quick motion to a door of the room, a window of the room, or the like), clothing 312 (e.g., hospital gowns 362, civilian clothing, pants 360, shirts 356, dresses 358, or the like), facial features 310, or the like. Additionally, certain auditory information can be captured by the microphone 190 that may be indicative of an attempted elopement. This auditory information can be in the form of specific words or phrases ("let's go" or "be quiet" for example) as well as a particular tone of voice or non-word sound (whispering or "shushing" sounds, for example).

The machine learning models 254 may be trained on this data in, for example, at least one neural network 266 (FIG. 12) that includes a plurality of neurons that may be weighted differently depending on outcomes (e.g., actual elopements or actual patients being out of frame) of the historical data. It is contemplated that the data stored in the refined data output database 256 may be anonymized and limited to identifiable features according to some examples.

It is also contemplated that the network previously described in reference to FIG. 11 may be incorporated with the elopement detection system 240. In this way, the elopement detection functions and the pose estimation functions may operate on the same network using the same or similar protocols for data exchange between the monitoring unit 16 and the servers 248, 250, the observer client 247, or the like. In some examples, the pose estimation and the elopement detection features may also be processed simultaneously in order to fortify determinations or estimations of an actual elopement of the patient.

As exemplified in FIGS. 1-3 and 12-16, the patient monitoring system 10 can include the estimation networks 54 and the elopement detection system 240 for capturing various data points 50 that can be used for monitoring a patient 14 within the care setting 12. Using the elopement detection system 240, the camera 40 and other components of the monitoring unit 16 can be used for capturing the data points 50 that can relate to any one of various features of the patient 14 and other individuals (non-patients 316) present within the care setting 12. The data points 50 observed and tracked by the elopement detection system 240 can include or relate to a combination of facial features 310, as well as components of clothing 312 for each person observable within the video feed 42. Using these data points 50, the processor 48 for the elopement detection system 240 is configured to associate the data points 50 for the combination of facial features 310 with the data points 50 for the components of clothing for each person to define a confirmed association 314 for at least the patient 14. The elopement detection system 240 can also generate these confirmed associations 314 for other non-patients 316 present within the care setting 12.

Where the elopement detection system 240 generates the confirmed associations 314 for a plurality of people in the care setting 12, the processor 48 is further configured to identify, for each confirmed association 314, whether that person is a patient 14 or a non-patient 316. This identification of the various confirmed associations 314 allows the elopement detection system 240 to track the patient 14 as the patient 14 moves through the care setting 12, and as other people within the care setting 12 move around the patient 14. The elopement detection system 240 is also configured to verify the identity of the confirmed association 314 of the patient 14 by comparing updated data points 50 from the video feed 42 with the data points 50 of the confirmed association 314. Accordingly, the processor 48 periodically compares the confirmed association 314 for the patient 14 and other individuals within the care setting 12 with updated data points 50 captured from the video feed 42.

Referring again to FIGS. 1-3 and 12-16, it is contemplated that the updated data points 50 relate to similar data points 50 that were previously captured to ascertain and define each of the confirmed associations 314 for the people within the care setting 12. Using the elopement detection system 240, an alert or elopement warning 282 can be activated when the confirmed association 314 of the patient 14 cannot be verified based upon the comparison with the updated data points 50. Accordingly, where the patient 14 changes clothes 312, the data points 50 for the combination of facial features 310 and the components of clothing 312 for the confirmed association 314 no longer match. In this condition, the alert can be activated for an elopement indication 330. Additionally, the alert for the elopement indication 330 can be activated where the confirmed association 314 of the patient 14 can no longer be found within the video feed 42, in particular, after the video feed 42 is able to be moved using the PTZ tracking system.

According to the various aspects of the device, as exemplified in FIGS. 1-3 and 12-16, the elopement detection system 240 for the patient monitoring system 10 can be activated when the patient 14 leaves a particular boundary line 130. This boundary line 130 can be a virtual line or bounding box surrounding the bed 78 or surrounding a non-movable seating area, such as a couch, recliner or other similar stationary seating. Accordingly, when the patient 14 stands up within the care setting 12 and is able to ambulate, or be moved within a wheelchair through the care setting 12, the elopement detection system 240 can activate to define the various confirmed associations 314 related to each person within the care setting 12. These confirmed associations 314 are then tracked at least for as long as the patient 14 is outside of the various predetermined boundary lines 130 of the care setting 12. The activation of the elopement detection system 240 can activate automatically or a prompt can be delivered to the observer client 247 that the elopement detection system 240 needs to be activated.

Referring again to FIGS. 1-3 and 12-16, according to various aspects of the device, the elopement detection system 240 can generate and verify a confirmed association 314 with respect to the patient 14 at any time the patient 14 is within the video feed 42. Accordingly, while the patient 14 is in bed 78 or within stationary seating, the elopement detection system 240 can capture the data points 50 related to at least the combination of facial features 310, and, where visible, the components of clothing 312, to generate the confirmed association 314 for the patient 14. When the patient 14 gets out of bed 78 or stands up from the seated position, the elopement detection system 240 can then activate and can verify the previously generated confirmed association 314.

According to the various aspects of the device, the components of clothing 312 that can be ascertained using the elopement detection system 240 can include any one of various clothing-related data points 50. These data points 50 can include, but are not limited to, clothing outline, clothing color, clothing pattern, transition 354 from torso 350 to legs 352, leg covering configuration, and other similar clothing-related data points 50. The transition 354 from torso 350 to legs 352 can include features such as a belt, waistband, change in clothing from a shirt 356 to a dress 358 or pants 360, a lack of change or transition 354 in the case of a hospital gown 362, and other similar transitions. The leg covering configuration typically includes distinguishing between pants 360, skirts and dresses 358, hospital gowns 362, and other similar leg coverings. The goal of capturing the data points 50 related to the components of clothing 312 is to differentiate between a patient 14 within the care setting 12 and a non-patient 316 within the care setting 12, such as doctors, visitors, hospital staff, and other individuals.

According to the various aspects of the device, the combination of facial features 310 that are used to define the confirmed association 314 can include any one of various data points 50. These data points 50 can include, but are not limited to, outline of hair 380, outline of face 382, relative locations of various facial features 310, and other similar data points 50. By way of example, and not limitation, the relative locations of the facial features 310 can include the relative locations of any two or more of left eye 384, right eye 386, mouth 388, end of nose 390, bridge of nose 392, left ear 394, right ear 396, chin 398, and other similar facial features 310. Additionally, the combination of facial features 310 can include, but are not limited to the relative distances between any two or more of the various facial features 310 identified herein.

The goal of capturing these data points 50 related to the combination of facial features 310 is to distinguish the various individuals present within the care setting 12. These data points 50 are not meant to capture identity, but are rather intended to differentiate between the various individuals so that a patient 14 can be differentiated from a non-patient 316. This is done by determining the data points 50 related to the components of clothing 312 for the individual as being related to a patient 14 or a non-patient 316. The components of clothing 312 can then be associated with the combination of facial features 310 to form a confirmed association 314. Again, this confirmed association 314 is not used to identify any information other than distinguishing between a patient 14 and a non-patient 316. Use of these data points 50 is configured to be captured, in an anonymous fashion, such that the identity of the individual is not readily ascertainable or is not ascertainable based upon a review of the particular data points 50 captured by the elopement detection system 240.

According to various aspects of the device, the elopement detection system 240 is meant to capture a base or minimum amount of data points 50 related to the combination of facial features 310 and the components of clothing 312. In certain instances, multiple people may have similar combinations of facial features 310 (such as family members and the like) and/or similar components of clothing 312 (such as co-workers, teams, or hospital staff). Where the base amount of data points 50 are not able to perform or determine confirmed associations 314 that are distinguishable from one another, additional data points 50 may be captured so that the confirmed associations 314 can be distinguishable at least between patient 14 and non-patients 316 within the care setting 12.

Referring again to the elopement detection system 240, as exemplified in FIGS. 1-3 and 12-16, when capturing data points 50 from the video feed 42 related to the components of clothing 312, the elopement detection system 240 can monitor leg coverings to observe certain differences that may be indicative of a hospital gown 362 rather than pants 360 or a dress 358. By way of example, and not limitation, the elopement detection system 240 may observe two discretely visible legs 352 that may be indicative of a pair of pants 360, shorts or certain street clothes. Additionally, certain colors or patterns present on the clothing 312 as well as a transition 354 between torso 350 and legs 352 may also be indicative of street clothes, or a hospital gown 362. Using these data points 50, components of clothing 312 can be utilized for distinguishing a patient 14 versus a non-patient 316. These data points 50 related to components of clothing 312 are then associated with combinations of facial features 310 to form the confirmed association 314 related to a patient 14 or a non-patient 316.

As described herein, it is contemplated that, in certain aspects of the device, the confirmed association 314 with respect to the patient 14 is the only confirmed association 314 that is made and verified using the elopement detection system 240. In such an aspect of the device, the confirmed association 314 of the patient 14 can be continually verified using updated data points 50 from the buffered sections 46 of the video feed 42.

According to various aspects of the device, the elopement detection system 240 typically activates an alert when an elopement indicator 280 is verified, such as the patient 14 exiting the care setting 12. It is contemplated that the elopement detection system 240 can be placed in communication with certain scheduling features of the care facility. These scheduling features can be known appointments or other times when the patient 14 is scheduled to leave the care setting 12. In this instance, the elopement detection system 240 can compare a particular elopement indicator 280 with the schedule related to the particular patient 14. In this manner the elopement detection system 240 can verify that the patient 14 is not attempting an elopement, but is rather exiting the care setting 12 to attend a scheduled event.

The elopement detection system 240 can also recognize when certain authorized individuals are present within the care setting 12, such as hospital staff. In certain situations, it may be necessary for a member of the hospital staff to escort the patient 14 outside of the care setting 12, such as for physical therapy. The member of hospital staff can provide an indication or authorization that they are authorized to help the patient 14 leave the care setting 12. In this manner, the movements of the patient 14 can be discriminated and distinguished between elopement events and scheduled or authorized actions.

Referring again to FIGS. 1-3 and 12-16, the elopement detection system 240 can undergo a verification step for at least the confirmed association 314 of the patient 14 at regular intervals when the patient 14 is outside of the boundary line 130. This verification step can also occur when there is an obstruction, such as a person, a fixture, or other object that passes between the patient 14 and the monitoring unit 16. In this condition, the patient 14 can be temporarily out of view within the video feed 42 or at least partially obstructed within the video feed 42. When the patient 14 reappears or is fully in view within the video feed 42, the verification step can be performed to verify the confirmed association 314 of the patient 14.

It is contemplated that the elopement detection system 240 can capture data points 50 of individuals in the care setting 12 for the patient 14 related to different sides 410 of the corresponding individual. In this manner, as a person is walking through the care setting 12, the person may be turned to the side 410 in relation to the camera 40 or may have their back 412 turned to the camera 40. For each person, the elopement detection system 240 can capture data points 50 that will enable the elopement detection system 240 to generate a confirmed association 314 that relates to each side 410 and the back 412 of the person.

By way of example, and not limitation, as a person moves through the care setting 12 data points 50 can be tracked that relate to the portion of the person that is facing the camera 40. Accordingly, the data points 50 related to the combination of facial features 310 that are facing the camera 40 can be tracked. As the person turns, a different combination of facial features 310 can be tracked as data points 50 for the confirmed association 314, where these data points 50 are visible within the video feed 42. Similarly, the data points 50 related to the components of clothing 312 can also vary as the person moves and turns within the care setting 12. Accordingly, the data points 50 that relate to the combination of facial features 310 and the components of clothing 312, and the confirmed association 314 that is generated from these data points 50 can be in the form of a three-dimensional set 430 of data points 50. This three-dimensional set 430 of data points 50 and the resulting confirmed association 314 can be tracked regardless of which way the person is facing in relation to the camera 40. Accordingly, the elopement detection system 240 can track the patient 14 and non-patients 316 as they move and turn within the care setting 12.

Referring now to FIGS. 1-3 and 12-17, having described various aspects of the patient monitoring system 10, and the elopement detection system 240, a method 800 is disclosed for operating the elopement detection system 240. According to the method 800, a step 802 includes activating the elopement detection system 240 when the patient 14 is outside of a predetermined boundary line 130. Step 804 includes analyzing buffered sections 46 of the video feed 42 to identify the combination of facial features 310 and components of clothing 312 for a patient 14 that is outside of the predetermined boundary line 130. According to the method 800, step 806 includes associating the combination of facial features 310 with the components of clothing 312, or vice versa, for each person within the care setting 12 to define and distinguish the various confirmed associations 314. After these confirmed associations 314 are determined, the method 800 includes step 808 for verifying the confirmed association 314 of a patient 14 by comparing the combination of facial features 310 with the components of clothing 312 of the patient 14 with respect to updated data points 50 that are ascertained within the buffered sections 46 of the video feed 42. Where the confirmed association 314 cannot be verified or where the confirmed association 314 is no longer able to be verified, the elopement detection system 240 can activate an alert related to a possible elopement with respect to the patient 14 (step 810). The unverified status of the patient 14 with respect to the confirmed association 314 can be based upon the patient 14 changing clothes 312 such that the combination of facial features 310 no longer matches the components of clothing 312 that was previously part of the confirmed association 314. This lack of verification can also be a result of the patient 14 exiting the care setting 12.

As described herein, the elopement detection system 240, as with components of the patient monitoring system 10, generally, can be used for ascertaining when a particular adverse event 22, such as elopement has occurred. Additionally, over time, these data points 50 and confirmed associations 314 and movements of the confirmed associations 314, in particular with respect to the patient 14, can be anonymized and recorded within a memory 52. Over time, this memory 52 can be accessed for comparing current movements of a patient 14, or other individual, with these past anonymized events to form a prediction with respect to a possible elopement indication 330. By way of example, and not limitation, various movements of a patient 14 who is outside of a predetermined boundary line 130 may be indicative of an elopement event. Also, movements of non-patients 316, such as visitors, visiting the patient 14 may also be indicative of an elopement event. As the library of elopement indications 330 is generated and built upon over time, refinement of these elopement indicators 280 can become more robust and substantial such that a prediction can be made with increasing accuracy over time with respect to an attempted elopement from the care setting 12. Accordingly, use of the elopement detection system 240 can be used to both verify the existence of an elopement as well as a prediction with respect to a possible elopement.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A patient monitoring system comprising:
a camera that selectively delivers a video feed to a monitoring station;
a processor that evaluates the video feed, wherein the processor converts the video feed into a plurality of data points for an elopement detection system, and wherein the plurality of data points for the elopement detection system correspond at least to a combination of facial features and components of clothing for each person within the video feed, wherein the processor is further configured to;
associate the combination of facial features and the components of clothing for each person to define a confirmed association;
identify, for each confirmed association, whether the person is a patient or a non-patient;
verify the confirmed association of the patient by comparing updated data points from the video feed with the confirmed association; and
activate an alert when the confirmed association of the patient is unverified based upon a comparison with the updated data points.

2. The patient monitoring system of claim 1, wherein the confirmed association is unverified at least where the combination of facial features and the components of clothing for the confirmed association are no longer able to be associated with respect to the patient.

3. The patient monitoring system of claim 1, wherein the confirmed association is unverified at least where the confirmed association of the patient is no longer within the video feed of the camera.

4. The patient monitoring system of claim 1, wherein the processor includes a first server that analyzes buffered sections of the video feed to locate and track the combination of facial features that make up the confirmed association.

5. The patient monitoring system of claim 4, wherein the processor includes a second server that analyzes the buffered sections of the video feed to locate and track the components of clothing that make up the confirmed association.

6. The patient monitoring system of claim 5, wherein the first server and the second server define the elopement detection system, and wherein the elopement detection system is activated when the patient is located outside of a predetermined boundary.

7. The patient monitoring system of claim 6, wherein the predetermined boundary is at least one of a bed of the patient and a non-movable seating area of the patient.

8. The patient monitoring system of claim 1, wherein the camera includes at least one actuator that provides pan, tilt, and zoom (PTZ) tracking for monitoring the confirmed association of the patient within a patient care setting.

9. The patient monitoring system of claim 8, wherein the PTZ tracking of the camera is operated by an observer client that receives and monitors buffered sections of the video feed.

10. The patient monitoring system of claim 1, wherein the components of clothing for defining the confirmed association include at least one of clothing outline, clothing color, clothing pattern, transition from torso to legs, and leg covering configuration.

11. The patient monitoring system of claim 1, wherein the combination of facial features for defining the confirmed association include relative distances between at least two of left eye, right eye, mouth, end of nose, bridge of nose, left ear, right ear, and chin.

12. The patient monitoring system of claim 1, wherein the combination of facial features for defining the confirmed association include at least one of outline of hair, outline of face, and relative locations of at least two of left eye, right eye, mouth, end of nose, bridge of nose, left ear, right ear, and chin.

13. The patient monitoring system of claim 1, wherein the video feed is delivered as buffered sections of the video feed, and wherein the processor evaluates the buffered sections of the video feed and converts each of the buffered sections of the video feed into the plurality of data points for the elopement detection system.

14. The patient monitoring system of claim 1, wherein the plurality of data points are stored as a digital wire frame that can be compared with the updated data points.

15. A method for operating an elopement detection system for a patient monitoring system, the method comprising steps of:
activating the elopement detection system when a patient is outside of a predetermined boundary;
analyzing buffered sections of a video feed to identify a combination of facial features and components of clothing for the patient outside of the predetermined boundary;
associating the combination of facial features with the components of clothing for each person to define a confirmed association;
verifying the confirmed association of the patient by comparing the combination of facial features with the components of clothing of the patient; and
activating an alert if the confirmed association of the patient is unverified based upon changes in the combination of facial features or the components of clothing of the confirmed association.

16. The method of claim 15, wherein the step of analyzing the buffered sections of the video feed includes analyzing the buffered sections of the video feed to identify the combination of facial features and the components of clothing for a non-patient.

17. The method of claim 15, wherein the step of verifying the confirmed association of the patient occurs according to predetermined time intervals and after an obstruction is temporarily present between a camera and the patient.

18. The method of claim 15, wherein the step of activating the alert occurs when the confirmed association of the patient is observed moving toward an egress of a patient care setting and is not visible within the video feed for a predetermined period of time.

19. The method of claim 15, wherein the predetermined boundary extends around a bed of the patient.

20. The method of claim 15, wherein the combination of facial features for defining the confirmed association include at least one of outline of hair, outline of face, and relative locations of at least two of left eye, right eye, mouth, end of nose, bridge of nose, left ear, right ear, and chin, and wherein the components of clothing for defining the confirmed association include at least one of clothing outline, clothing color, clothing pattern, transition from torso to legs, and leg covering configuration.

\* \* \* \* \*